United States Patent
Siu et al.

(10) Patent No.: US 10,032,135 B2
(45) Date of Patent: Jul. 24, 2018

(54) MODERN CALENDAR SYSTEM INCLUDING FREE FORM INPUT ELECTRONIC CALENDAR SURFACE

(75) Inventors: Chun Hin Nelson Siu, Kirkland, WA (US); Jonathan Cadiz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 481 days.

(21) Appl. No.: 13/423,792

(22) Filed: Mar. 19, 2012

(65) Prior Publication Data

US 2013/0242708 A1 Sep. 19, 2013

(51) Int. Cl.
*G06F 3/048* (2013.01)
*G06Q 10/10* (2012.01)
*G06Q 10/06* (2012.01)

(52) U.S. Cl.
CPC ..... *G06Q 10/109* (2013.01); *G06Q 10/06314* (2013.01); *G06Q 10/1093* (2013.01); *G06Q 10/1095* (2013.01); *H04M 2203/2072* (2013.01); *Y10S 715/963* (2013.01)

(58) Field of Classification Search
CPC ................ G06Q 10/109; G06Q 10/10; G06Q 10/06314; G06Q 10/1093; G06Q 10/1095; H04M 1/72566; H04M 2203/2072; G06F 2203/04804; G06F 3/0486; G06F 3/048; G06F 17/243; Y10S 715/963
USPC ........................................................ 715/752
See application file for complete search history.

(56) References Cited

U.S. PATENT DOCUMENTS

| | | | |
|---|---|---|---|
| 5,063,600 A * | 11/1991 | Norwood | 382/186 |
| 5,323,314 A | 6/1994 | Baber et al. | |
| 5,517,578 A | 5/1996 | Altman et al. | |
| 5,625,377 A * | 4/1997 | Jenson | 715/860 |
| 6,088,026 A | 7/2000 | Williams | |
| 6,480,830 B1 | 11/2002 | Ford et al. | |
| 6,504,956 B1 | 1/2003 | Gannage et al. | |
| 6,587,895 B1 | 7/2003 | Golovchinsky et al. | |
| 6,597,378 B1 | 7/2003 | Shiraishi et al. | |
| 6,820,096 B1 | 11/2004 | Kanevsky et al. | |
| 7,203,903 B1 * | 4/2007 | Thompson et al. | 715/203 |
| 7,392,041 B2 | 6/2008 | Brush et al. | |

(Continued)

FOREIGN PATENT DOCUMENTS

CN 201153781 Y 11/2008
EP 2104027 A1 9/2009
(Continued)

OTHER PUBLICATIONS

"Google Calendar Adds Event Colors", Published on: May 9, 2011, Available at: http://googlesystem.blogspot.com/2011/05/google-calendar-adds-event-colors.html.

(Continued)

*Primary Examiner* — Renee D Chavez
*Assistant Examiner* — Jaime Duckworth

(57) ABSTRACT

Embodiments provide electronic calendar application features and functionality that includes a free form calendar input surface, but the embodiments are not so limited. In an embodiment, a computer-based method can be configured to provide electronic calendar features including a free form calendar surface that enables users to personalize the calendar surface using a variety of input types and methods. Other embodiments are included.

20 Claims, 17 Drawing Sheets

(56) References Cited

U.S. PATENT DOCUMENTS

| | | | |
|---|---|---|---|
| 7,458,014 B1 | 11/2008 | Rubin et al. | |
| 7,721,224 B2* | 5/2010 | Sellen et al. | 715/804 |
| 7,793,233 B1 | 9/2010 | Sellers et al. | |
| 2002/0064308 A1 | 5/2002 | Altman et al. | |
| 2002/0091709 A1 | 7/2002 | Jung | |
| 2002/0191035 A1 | 12/2002 | Selent | |
| 2003/0101235 A1* | 5/2003 | Zhang | 709/218 |
| 2004/0148356 A1 | 7/2004 | Bishop et al. | |
| 2005/0091578 A1* | 4/2005 | Madan et al. | 715/512 |
| 2005/0108233 A1 | 5/2005 | Metsatahti et al. | |
| 2006/0136833 A1 | 6/2006 | Dettinger et al. | |
| 2006/0277087 A1 | 12/2006 | Error | |
| 2007/0168892 A1* | 7/2007 | Brush et al. | 715/963 |
| 2007/0186193 A1 | 8/2007 | Curran | |
| 2008/0034315 A1* | 2/2008 | Langoulant et al. | 715/780 |
| 2008/0059894 A1 | 3/2008 | Cisler et al. | |
| 2008/0098317 A1 | 4/2008 | Chen et al. | |
| 2008/0148181 A1 | 6/2008 | Reyes et al. | |
| 2008/0175104 A1 | 7/2008 | Grieb et al. | |
| 2008/0177609 A1 | 7/2008 | Grieb et al. | |
| 2008/0222170 A1 | 9/2008 | Farnham et al. | |
| 2008/0244442 A1 | 10/2008 | Veselova et al. | |
| 2008/0244444 A1 | 10/2008 | Bauman et al. | |
| 2008/0256114 A1* | 10/2008 | Rasmussen | G06F 17/2205 |
| 2008/0307000 A1 | 12/2008 | Paterson et al. | |
| 2009/0006562 A1 | 1/2009 | Son et al. | |
| 2009/0024952 A1 | 1/2009 | Brush et al. | |
| 2009/0222741 A1 | 9/2009 | Shaw et al. | |
| 2009/0267909 A1 | 10/2009 | Chen et al. | |
| 2009/0327169 A1 | 12/2009 | Kamar et al. | |
| 2010/0009332 A1 | 1/2010 | Yaskin et al. | |
| 2010/0070880 A1 | 3/2010 | Chinta | |
| 2010/0077291 A1 | 3/2010 | Takahashi et al. | |
| 2010/0115334 A1 | 5/2010 | Malleck et al. | |
| 2010/0182246 A1 | 7/2010 | Petschnigg et al. | |
| 2010/0223089 A1 | 9/2010 | Godfrey et al. | |
| 2010/0313156 A1 | 12/2010 | Louch | |
| 2011/0078622 A1* | 3/2011 | Missig et al. | 715/784 |
| 2011/0099490 A1 | 4/2011 | Barraclough et al. | |
| 2011/0196752 A1 | 8/2011 | Paulik | |
| 2011/0228642 A1 | 9/2011 | Ito | |
| 2011/0239146 A1* | 9/2011 | Dutta | G06Q 10/109 715/768 |
| 2011/0239158 A1* | 9/2011 | Barraclough et al. | 715/808 |
| 2013/0152008 A1 | 6/2013 | Moore et al. | |
| 2013/0212492 A1 | 8/2013 | Chen et al. | |
| 2013/0246912 A1 | 9/2013 | Siu | |
| 2013/0246963 A1 | 9/2013 | Siu et al. | |
| 2017/0277377 A1 | 9/2017 | Siu et al. | |

FOREIGN PATENT DOCUMENTS

| | | |
|---|---|---|
| EP | 2224388 A1 | 9/2010 |
| JP | Hei 08-510854 | 11/1996 |
| JP | H09-218812 | 8/1997 |
| JP | 2001-84228 | 3/2001 |
| JP | 2001-318751 | 11/2001 |
| JP | 2002-74087 | 3/2002 |
| JP | 2004-302540 | 10/2004 |
| JP | 2005-129062 | 5/2005 |
| JP | 2005-228086 | 8/2005 |
| JP | 2006-085695 | 3/2006 |
| JP | 2009-294728 | 12/2009 |
| JP | 2010-079534 | 4/2010 |
| WO | WO 1994/028505 | 12/1994 |
| WO | WO 1995/034047 | 12/1995 |

OTHER PUBLICATIONS

Wong, Jessica Cam, "How To Use Google Calendar & The Event Flair Labs Feature To Track Your New Year'S Resolutions", Available at: http://www.makeuseof.com/tag/google-calendar-event-flair-labs-feature-track-years-resolutions/.

Sieber, Tina, "Extensions to Add Calendar & Task Manager to Thunderbird 3", Published on: Sep. 7, 2010, Available at: http://www.makeuseof.com/tag/5-extensions-add-calendar-task-manager-thunderbird-3/.

Pott, Kyle, "Attach Sticky Notes to Email in Thunderbird with XNote", Published on: Sep. 4, 2007, Available at: http://lifehacker.com/295957/attach-sticky-notes-to-email-in-thunderbird-with-xnote.

"Info Select 8 Reviews", Retrieved on: Dec. 8, 2011, Available at: http://www.miclog.com/is/8/reviews.htm.

"Unobtrusive Reminders & Quick Notes on Your Desktop", Retrieved on: Dec. 8, 2011, Available at: http://www.cutereminder.com/.

Iga, et al., "SnapShoot: Integrating Semantic Analysis and Visualization Techniques for Web-based Note Taking System", In Proceedings of Asia-Pacific Symposiun on Information Visualization, Feb. 1-3, 2006, pp. 1-7.

International Search Report dated Jun. 10, 2013 in PCT/US2013/028118 filed Feb. 28, 2013.

International Search Report dated Jun. 3, 2013 in PCT/US2013/028119 filed Feb. 28, 2013.

Office Action for U.S. Appl. No. 13/423,865, dated Feb. 28, 2014.

Office Action for U.S. Appl. No. 13/423,865, dated Mar. 19, 2015, 22 pages.

Office Action for U.S. Appl. No. 13/423,938, dated Feb. 23, 2015, 19 pages.

Office Action for U.S. Appl. No. 13/423,865, dated Sep. 9, 2014.

Office Action for U.S. Appl. No. 13/423,938, dated Aug. 29, 2014.

U.S. Appl. No. 13/423,865, Office Action dated Jan. 6, 2016, 14 pgs.

Chinese 1st Office Action in Application 201310087211.9, dated Oct. 27, 2015, 13 pgs.

European Communication in Application 13765253.3, dated Nov. 3, 2015, 1 page.

European Communication in Application 13764233.6, dated Oct. 23, 2015, 1 page.

U.S. Appl. No. 13/423,865, Amendment and Response filed May 27, 2014, 10 pgs.

U.S. Appl. No. 13/423,865, Amendment and Response filed Dec. 9, 2014, 9 pgs.

U.S. Appl. No. 13/423,865, Amendment and Response filed Jun. 19, 2015, 11 pgs.

U.S. Appl. No. 13/423,938, Amendment and Response filed Dec. 1, 2014, 10 pgs.

U.S. Appl. No. 13/423,938, Amendment and Response filed May 26, 2015, 12 pgs.

European Extended Search Report in Application 13764233.6, dated Oct. 6, 2015, 11 pgs.

Baldauf, Ken, et al., "Succeeding with Technology, In Succeeding with Technology", Jan. 14, 2010, Course Technology, pp. 7-11.

Fulton, Jennifer, et al., "Outlook 2010 All-in-One for Dummies", In "Outlook 2010 All-in-One for Dummies", Jul. 26, 2010, For Dummies, pp. 119-125 and 158-191.

Fulton, Jennifer, et al., "Outlook 2010 All-in-One for Dummies", In "Outlook 2010 All-in-One for Dummies", Jul. 26, 2010, For Dummies, pp. 285-325 and 391-412.

Fulton, Jennifer, et al., "Outlook 2010 All-in-One for Dummies", In "Outlook 2010 All-in-One for Dummies", Book 6—Tracking Tasks, Taking Notes, and Organizing Life with OneNote, Jul. 26, 2010, For Dummies, pp. 529-578.

Mayagayam, "Notes Plus 3 Beta—02 (More Cool Stuff)", YouTube Internet Video, Dec. 10, 2011, Retrieved from the Internet: URL:https://www.youtube.com/watch?v=LKJvnOFsMsc, the whole document, 1 page.

Advsoft: "CalPad product for iPad—Calendar, Task, and Notes Management", YouTube Internet Video, Jun. 9, 2011, retrieved from the internet: https://www.youtube.com/watch?v=h307eQUIVKM, retrieved Sep. 23, 2015, the whole document, 1 pg.

Wikipedia: "Stylus (computing)", Internet Article, Feb. 18, 2012, Retrieved from the Internet: URL:https://en.wikipedia.org/w/index.php?title=Stylus (computing)&oldid=477591157, the whole document, 2 pgs.

(56) References Cited

OTHER PUBLICATIONS

Wikipedia: "Digital Pen", Internet Article, Feb. 24, 2012, Retrieved from the Internet: URL:https://en.wikipedia.org/w/index.php?title=Digital_pen&oldid=478610585,retrieved Sep. 22, 2015, the whole document, 4 pgs.
Wikipedia: "Pen Computing", Internet Article, Mar. 5, 2012, Retrieved from the Internet: URL:https://en.wikipedia.org/w/index.php?title=Pen_computing&oldid=480360691, retrieved Sep. 22, 2015, the whole document, 8 pgs.
European Extended Search Report in Application 13765253.3, dated Oct. 16, 2015, 9 pgs.
U.S. Appl. No. 13/423,938, Office Action dated Feb. 4, 2016, 23 pgs.
U.S. Appl. No. 13/423,865, Amendment and Response filed Apr. 4, 2016, 14 pgs.
U.S. Appl. No. 13/423,938, Amendment and Response filed May 4, 2016, 17 pgs.
U.S. Appl. No. 13/423,865, Notice of Allowance dated May 6, 2016, 8 pgs.
Chinese 2nd Office Action in Application 201310087211.9, dated May 26, 2016, 8 pgs.
Chinese Office Action in Application 201310086939.X, dated Jun. 2, 2016, 18 pgs.
U.S. Appl. No. 13/423,938, Office Action dated Jul. 15, 2016, 27 pgs.
U.S. Appl. No. 13/423,865, Notice of Allowance dated Aug. 22, 2016, 5 pgs.
U.S. Appl. No. 13/423,865, Notice of Allowance dated Oct. 26, 2016, 5 pgs.
U.S. Appl. No. 13/423,938, Amendment and Response filed Oct. 17, 2016, 17 pgs.
Japanese Notice of Rejection in Application 2015-501684, dated Nov. 9, 2016, 9 pgs.
Chinese 3rd Office Action in Application 201310087211.9, dated Nov. 28, 2016, 8 pgs.
Chinese 2nd Office Action in Patent Application No. 201310086939.X, dated Dec. 30, 2016, 16 pgs.
Japanese Notice of Rejection in Application 2015-501685, dated Dec. 27, 2016, 9 pgs.
Chinese 1st Office Action in Application 201380015263.3, dated Aug. 23, 2016, 11 pgs.
Chinese Notice of Allowance in Application 201310087211.9, dated Mar. 1, 2017, 4 pgs.
U.S. Appl. No. 13/423,938, Notice of Allowance dated Mar. 9, 2017, 17 pgs.
U.S. Appl. No. 13/423,938, Notice of Allowance dated Jun. 22, 2017, 5 pgs.
Chinese 3rd Office Action and Search Report in Chinese Patent Application 201310086939.X, dated Mar. 31, 2017, 17 Pages.
Chinese $2^{nd}$ Office Action in Application 201380015263.3, dated Apr. 19, 2017, 9 pgs.
Japanese Notice of Allowance in Application 2015-501684, dated Mar. 21, 2017, 4 pages.
European Office Action in Application 13765253.3, dated Apr. 13, 2017, 8 pgs.
U.S. Appl. No. 13/423,938, Notice of Allowance dated May 10, 2017, 5 pgs.
U.S. Appl. No. 13/423,938, Amendment after allowance filed Apr. 19, 2017, 8 pgs.
Chinese 1st Office Action in Application 201380015263.3, dated Apr. 19, 2017, 9 pgs.
Chinese Office Action in Application 201380015263.3, dated Nov. 3, 2017, 7pgs.
Japanese Notice of Allowance in Application 2015-501685, dated Oct. 4, 2017, 4 pgs.
European Summons in Application 13765253.3, dated Mar. 28, 2018, 10 pages.

* cited by examiner

NOVEMBER

| SUNDAY | MONDAY | TUESDAY | WEDNESDAY | THURSDAY | FRIDAY | SATURDAY |
|---|---|---|---|---|---|---|
| 31 | 1 | 2 | 3 | 4 | 5 | 6 |
| | | | 9 AM SCRUM MEETING | | WISDOM TEETH REMOVAL | |
| 7 | 8 | 9 | 10 | 11 | 12 | 13 |
| | CUSTOMER VISIT | VISUALIZATIONS ITERATION | | | 10AM TEAM MEETING | |
| 14 | 15 | 16 | | 8 | 19 | |
| EXPENSE REPORTS | | | 9AM Q4 TRIAGE PRESENTATION | | JAZZ JAM SESSION AT CROSSROADS | |
| 21 | | | HEADS DOWN SPECING | | | 27 |
| | | | | | | ULTIMATE TOURNAMENT |
| 28 | SOCCER GAME AT 5 | | | | | |

*FIGURE 5D*

NOVEMBER
SU MO TU WED THU FRI SAT
            1   2   3   4   5   6
 7   8   9  10  11  12  13
14  15  16  17  18  19  20
21  [22] 23  24  25  26  27
28  29  30

22

MONDAY

☁ TODAY
/// 83°F / 64°F

| | |
|---|---|
| 9 AM | |
| 10 AM | BROWN BAG: WOMAN AT MICROSOFT<br>LOCATION: 33/MT BAKER |
| 11 AM | |
| 12 PM | |
| 1 PM | |
| 2 PM | |
| 3 PM | |
| 4 PM | |
| 5 PM | |

TODAY 10AM TEAM TRIAGE

TOMORROW 4PM CROSS-ORG REPORT OUT

FRIDAY 9AM CUSTOMER SITE VISIT

10 MINS BROWN BAG: WOMAN AT MICROSOFT
LOCATION: 33/MT BAKER

NOV  19  20  21  22  23  24  25  26  27  28  29  30   DEC  1  2  3  4  5  6  7  8  9  10  11  12  13   TODAY | NEW

MODERN CALENDAR SYSTEM INCLUDING FREE FORM INPUT ELECTRONIC CALENDAR SURFACE

RELATED APPLICATIONS

The present application is related to application Ser. No. 13/423,865, filed Mar. 19, 2012, and titled, Electronic Note Taking Features Including Blank Note Triggers, and application Ser. No. 13/423,938, filed Mar. 19, 2012, and titled, Personal Notes on a Calendar Item.

BACKGROUND

Personal information management (PIM) systems provide data management features including contact, calendar, email, and other applications. For example, a PIM system can include an electronic calendar application with useful scheduling tools, including features that assist with personal and business events. It is not unusual for busy consumers to maintain calendars with synchronized and unsynchronized information on a smartphone, laptop, and desktop computers. Users use calendar applications to schedule and accept appointments and meetings, set reminders, and track tasks for example. However, current calendar application functionality lacks sufficient flexibility to allow consumers to freely utilize the electronic calendar surface. Research of actual customer calendars reveal a significant latent need around free form entry across the surface of the date grid.

Reminders can be used to remind a user of some event or task and surfaced using a calendar application. However, current reminder applications lack sufficient reminder protocol flexibility. For example, some applications use jarring interruptions such as reminder dialogs and other highly disruptive user interfaces (UIs) that distract users from current focus. At the same time, the level of interruption provided is, for the most part, disconnected from the perceived user importance of the reminder. For example, traditional appointment chimes and pop-up dialogs interrupt whatever the user is doing in an attempt to remind The user either keeps the reminder around, enduring the annoyance of seeing and/or repeatedly hearing alerts until completed; or dismisses it, running the risk of never getting reminded or annoyingly reminded after the fact.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide electronic calendar application features and functionality that includes a free form calendar input surface, but the embodiments are not so limited. In an embodiment, a computer-based method can be configured to provide electronic calendar features including a free form calendar surface that enables users to personalize the calendar surface using a variety of input types and methods. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 5A-5H depict examples of a number of electronic calendar application features.

DETAILED DESCRIPTION

Figure 1:
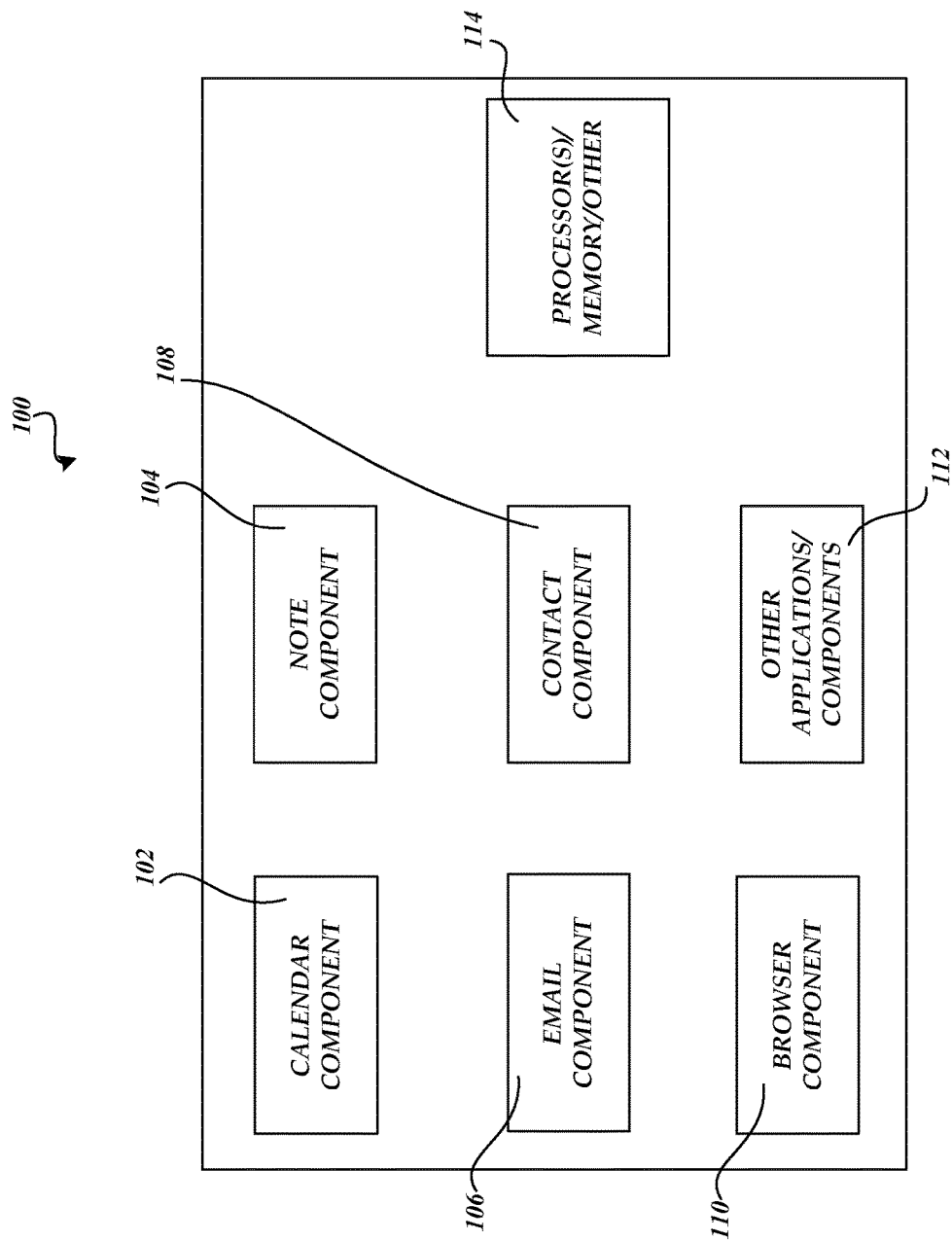
FIG. 1 is a block diagram of an exemplary system configured in part to provide a number of computerized application features and functionalities.

FIG. 1 is a block diagram depicting an exemplary system 100 that includes components configured in part to provide a number of computerized application features and functionalities including modern electronic calendar and electronic note-taking features that include free form input capabilities, but the components are not so limited. For example, functionality provided by the system 100 can be included as part of a desktop, laptop, handheld, tablet, or other type of computing or communication device/system. The system 100 of an embodiment includes computer processing, storage, and other components/resources to provide computing features and functionalities. While a number of components are shown, it will be appreciated that the system 100 can include fewer or greater numbers of components.

As shown in FIG. 1, the exemplary system 100 includes a calendar component 102, a note component 104, an email component 106, a contact component 108, a browser component 110, other applications/components 112, and/or processor(s) and memory resources 114. As described below, various aspects of the calendar component 102 enable users to use free form input anywhere on an associated electronic calendar surface, including for different calendar views using available input modalities (e.g., vocal, mouse, pen/stylus, display, touchscreen, etc.).

Users can enter input anywhere on the electronic calendar surface, in any orientation and/or configuration, and the calendar component 102 is configured to preserve the spatial and other input information. In an embodiment, the calendar component 102 can be configured with complex computer instructions that operate to capture free form input to the electronic calendar surface and display the captured information as the user uses an associated calendar application (e.g., web-based version, local version, etc.). For example, the electronic calendar surface can persist user free form entries input across date lines, at various locations and non-orthogonal angles within a date box in month view, at various times within a day week, etc.

As described below, spatial location, configuration (e.g., blank note, color, etc.), and/or arrangement of free form inputs serve a multitude of purposes which are meaningful to the user. In an embodiment, and as described further below, a blank note can be configured to serve as a trigger to store and/or restore application, contextual, and/or other information. Stored information associated with a blank note can be restored using a blank note trigger coupled to a restoration action. The note component 104 of an embodiment can be configured to manage blank note applications and triggers as part of an electronic reminder protocol. In another embodiment, the blank note functionality can be managed in part using the calendar component 102 or some other component, such as an operating system component for example.

With continuing reference to FIG. 1, the calendar component 102 enables a user to mark up and manipulate an electronic calendar surface or slate using a variety of freeform personalizations (e.g. handwritten input including ink, color, non-orthogonal and other orientations of text, graphics, pictures, video, etc.). The calendar component 102 allows for an ability to manipulate an appearance of a user's mark up on the electronic calendar surface (e.g., resize, relocate, reorient of content, text or pictures on the calendar as the user sees fit, etc.). The electronic calendar features and functionality can be used as part of locally installed application (e.g., an installed personal information management (PIM) system) and/or a web-based calendar accessed remotely using a computer network, such as a global communication network used by smartphone and other handheld communication device users for example. For example, a user may use a smartphone to access an online calendar from a server for use during a meeting appointment or as part of reviewing a schedule.

A user can open a personalized calendar view using the calendar component 102, and upon receiving a freeform input (e.g., via a control input, such as vocal, touch, mouse, stylus, etc.), the calendar component 102 uses the electronic calendar surface to display the user input. The calendar component 102 is configured to provide a freeform electronic calendar surface as part of capturing a user's inherent expressiveness such as by populating a calendar date grid with user input and configuration preferences. The electronic calendar surface provides an input area where users can utilize creativity and personalization while using the calendar. For example, red may be used to indicate items of a child's soccer schedule or use basic phone icons to denote going over potential cold call leads.

The calendar component 102 is configured to capture such ad-hoc expressions of reminders and personalization using the electronic calendar surface. The calendar component 102 provides personalization tools that enable each user to use their own creativity and personal expressiveness to manage a user's schedule and/or other information. The electronic calendar surface provides a ready interface for receiving free form personalized note taking in a form factor large enough to enable meaningful interaction. The electronic calendar surface conveniently supports quick and personalized note taking using a wide range of expressive artifacts while also allowing electronic replication, personalized/expressive reminders, and/or mobility. In one embodiment, a note-taking area is dedicated to note inputs and located adjacent to the electronic calendar surface or some other application or interface.

The ready and convenient availability of a freeform electronic calendar surface to capture each user's inherently personalized expressiveness using any number of digital interfaces including smartphone, laptop, tablet, or other computer interfaces. The freeform electronic calendar surface provides a persistent alternative as compared to: jotting things down on a piece of paper that routinely get lost, covered up, or having to enter a sub-optimally short text string on a smartphone without any note tracking capability. Direct entry on the electronic calendar surface provides an efficient and natural input method to capture user free form input, including personal or private notes, for any date related subclass of to do items. The calendar component 102 enables a user to personalize input using a variety of parameters including color, item size, anchor location, and/or other expressive/reminder feedback parameters.

As an example, color can be used to distinguish at a glance items on the electronic calendar surface, wherein the user can navigate between different calendar views as part of managing personal and/or business schedules. Color calendar expressions can be used rather than various cryptic symbols or unique short hand to denote importance or some other personal objective. Item size control and configuration on the electronic calendar surface provides further expressiveness and personalization. For example, a calendar item can be enlarged and/or animated (e.g., pop-out on the calendar in any view) to provide additional expressive dimensionality using pinch and stretch resizing operations. Users of the modern electronic calendar can resize items using intuitive and natural modifying actions on an item.

Item anchor location flexibility enables a user to physically rearrange an expressive calendar item to provide additional expressive dimensionality which can be highly meaningful to the user, based in part on an initial and/or final placement of the user freeform input. In one embodiment, the calendar component 102 uses a limited range of motion vertically within an item's assigned day, or a snap to behavior spreading an item over an area of a few days to sufficiently recreate paper calendar affordances.

According to an embodiment, the calendar component 102 is configured to include a number of user interface (UI) elements that provide user-friendly electronic calendar features, the UI elements including, but not limited to, a calendar grid element, a note element, an all day well element, a time grid element, an agenda view element, an appointment element, a meeting element, an edit box element, and a reminder element. The calendar component 102 of an embodiment implements note-taking features using the note element configured as a repurposed all day appointment to enable ready/simple note entry on the electronic calendar surface.

By repurposing the all day appointment parameters for note parameters, note taking capability is presented to the user as a light weight method of entering information directly on the electronic calendar surface without or absent the requirement of metadata normally associated with meetings and appointments (e.g., start/end times). The note element can be configured to accept ad-hoc text and other information on the electronic calendar surface that serve as reminders to the user, rather than external meeting commitments. In an embodiment, functionality of the note component 104 is used wholly or in part to manage note features associated with the calendar component 102.

Notes can be represented as all day appointments without attendees in the calendar environment. The appointment element retains full capabilities and is available to the user via an inspector. Contrast all day events that are representative of meetings with attendees that span an entire day. Users can interact with the electronic calendar surface in a number of ways, such as by single clicking to immediately bring up an edit box, single click once more on any empty area of a day with focus to activate an edit box, pressing a function key or another designated key or portion to activate an edit box, pressing or saying "enter" to activate an edit box on a day with focus, and/or simply starting to type, ink, or vocalize on a day or other area to capture the input. The edit box of one embodiment is confined to an all day well and/or not implemented in the time grid section.

In an embodiment, once a user provides an input, such as affixing a note for example, to the electronic calendar surface, the calendar component 102 operates to affirm/reflect capturing the entry by animating an edit box around the entered input (e.g., ink, type, vocal, touch, etc.) to disappear and/or storing note details as an all day appointment on the associated day in the background, wherein entered text can be stored as subject lines inside each all day appointment container. In one embodiment, calendar note details can be controlled for display according to low/medium/high detail settings, wherein the low setting is used to display notes, the medium setting is used to show notes along with compressed abstract or other time blocks, and the high setting is used both as a default detail setting and show all items as space allows.

The all day well element of an embodiment corresponds to a calendar section in a week/day view where items without a specific start time can be placed. The all day area can be enlarged above the week/day view to better support free form note taking input on the day. The time grid element is a calendar view showing specific hours of a day. The agenda view element is a calendar view that does not show specific hours of a day. The appointment element of one embodiment corresponds with a calendar item not having any invited attendees included on the time grid or some other location.

The meeting element can be described as an appointment item that includes attendees included on the time grid or some other location. The edit box element of an embodiment comprises an animated or otherwise highlighted boxed area that surrounds an active insertion point on the electronic calendar surface signifying that text or other entry is possible. The reminder element is a time based notification that warns the user about an associated item (e.g., appointments, meetings, notes, etc.). The notification can surface in the form of the reminder dialog or via a particular device protocol.

In addition to the free form calendar input surface, different calendar views can be used to control input scenarios. For example, when in the month calendar view, user notes can be dragged to another day within month view and the calendar component 102 can generate an animation pulse to acknowledge attachment of a note to a new day. An animation pulse can be used to acknowledge that an item has been added to a day whether it is visible or not after a drag operation, depending on the number of items displayed in the new day.

As another example, when in a week calendar view, when a user selects and moves a note of an all day well from any day of the week to another day, the calendar component 102 can be configured to display the note with any existing items in the destination day. In an embodiment, when a user places notes onto a time grid from an all day well, the calendar component 102 is configured to mark and store time grid notes as zero minute appointments. A start and/or end time can be dictated by the user's placement on the time grid. The calendar component 102 utilizes zero minute appointments as recognition of the fact that the note placed onto the calendar does not represent a discrete period of time in which an event or something else has to occur. Calendar notes are useful as simple reminders (e.g., pick up the kids) on the electronic calendar surface.

The calendar component 102 can store calendar notes and other items as zero minute appointments which correlates with a user's mental model of how the note is perceived. Notably, in these cases of putting a reminder on the calendar, the end times are typically not known or are not relevant to the user. The calendar component 102 can also use zero minute appointments to distinguish applied notes as reminders for surfacing according to various methods. For example one could see just the list of note reminders separate from meetings and/or appointments. Reminders for all day notes can be preserved by the calendar component 102 when transferring laterally to another day in the all day well and reminders for all day well to time grid transfers can be set to zero (0) minutes.

Users can use the calendar personalization tools to visually draw note reminders differently on the calendar surface such that they do not appear to be blocks of time but rather "scribbles" on the electronic calendar surface. As described below, blank notes can also be attached to the electronic calendar surface. Blank notes can be used as a trigger to restore a prior calendar state that was captured upon application of a blank note by a user. The blank note can be thought of an electronic sticky tab that also operates as a resurfacing trigger to automatically restore the user work space captured at the time of application of the blank note. In one embodiment, the note component 104 is configured to provide note-taking application and management operations for different components associated with note-taking features, such as calendar-based notes associated with the calendar component 102. Features of the note component 104 are described further below.

The calendar component 102 of an embodiment is configured to use an appointment item as part of providing a private or personal space for taking notes that correspond with the appointment item without sharing the notes or by limiting how the notes are to be shared, distributed, and/or disseminated. As described below, the calendar component 102 can provide an appointment or meeting item view that includes a designated space for taking notes. The calendar component 102 recognizes that notes entered into the personal note taking space of an appointment or meeting are to be maintained as private or according to some defined sharing association. In one embodiment, one or more dedicated memory portions (e.g., local and/or remote memory) can be used for segregating personal notes from the public information associated with an appointment or meeting.

The calendar component 102 uses the personal note taking space as part of providing an ability to retain personal notes on a meeting or an appointment independent of what the organizer or other party has sent. As part of providing personal note taking features, the calendar component 102 can be configured to associate textual and graphical metadata to an instance of a meeting or an appointment for personal consumption (e.g., to support meeting preparation, action items, and follow-ups). The calendar component 102 preserves the personal note data independent of the meeting or appointment being altered by a meeting organizer or other party (e.g., deletion, update, etc.). As described above, the calendar component 102 can use, create, and/or determine a sharing association to control how meeting notes are to be shared (e.g., between a secretary (e.g., an OUTLOOK Delegate) and a manager (e.g., a Principal account). Note sharing associations can be used to define private two-party sharing, no sharing, or amongst a select group of people privy to information on an original note taker's calendar as examples.

The calendar component 102 of one exemplary embodiment implements personal notes on a calendar item using an association of text and graphics using a calendar item object (e.g., OUTLOOK calendar object). Additional field properties containing text and graphics can be appended to the calendar item object (e.g., OUTLOOK MAPI item). In such an embodiment, the personal notes are retained by default on the user's account copy of the item and not shared among all other meeting participants. The calendar component 102 can use access or sharing permissions to define other users having access to the user's calendar which can include providing an option of seeing the personal notes. Correspondingly, the calendar component 102 can be used to control sharing of any personal notes according to different sharing relationships, such as a close sharing relationship defined by some working (e.g., executive-personal secretary) or other relationship (e.g., department/type-department/type, parent-child, etc.).

For example, an executive assistant can have note sharing privileges enabling the executive assistant to place notes to the executive (or vice-versa) in the calendar for an appointment without having other invitees or users see the personal notes. As another example, the personal note taking space can be used by a user wanting to be reminded of a list of things to address at a meeting without sharing the list with other meeting request recipients before the meeting. The personal note taking space associated with an appointment or meeting item operates to increase calendar reliability since a user will not have to worry about sending an appointment or meeting update to persist personal notes. The calendar component 102 can also utilize the personal note taking space to limit or prevent data loss when users open an invite from another user and make changes to the body of the item without losing the changes when an update and/or modification is received.

Referring again to FIG. 1, the note component 104 is configured to provide note-taking features and functionalities, including application and/or management of blank notes. Features of the note component 104 can be provided as part of an add-in, source, or other component. For example, features of the note component 104 can be included as complex programming included as part of functionality of an operating system (O/S), PIM system, or other component/application. The note component 104 of an embodiment is configured to manage note-taking and applying, including blank note features, at an O/S level. Note parameters, including blank note parameters, can be used in conjunction with PIM related tasks and other items prone to interruptions. For example, blank notes can be used as resurfacing triggers to revisit prior work, screen, or other configurations associated with composing and reading of long emails, incorporating feedback information into documents from email communications, meeting action items, etc.

As described below, when a user applies a blank note, the note component 104 is configured to capture and store information that a user is currently viewing or interacting with. The capture can be based on an number of factors including a blank note application path, note application timestamp(s), crossed boundaries or moved within some distance to factors, complete prior workspace restorations, etc. For example, as part of drafting a specification, an information worker can create and attach a blank note to a page of an electronic document which operates to create a resurfacing or blank note trigger to surface the page at some later time. As another example, a blank note trigger can be used with the calendar component 102 as a calendar reminder where a stored work context would be postponed by the user along with a blank note application, and a reminder to resume work on that context can be resurfaced (e.g., a pop-up or separate window) at a later date/time using a blank note trigger.

Warnings and/or alerts can be provided to the user before resurfacing previously in focus work/information based on a blank note application so as not to unduly interrupt current focus. The note component 104 can be configured to remove blank notes from a recent items list less recently used (implying less frequent use in practice) or no longer useful or relevant (e.g., deleted the item or items attached to or referenced by the blank note).

The note component 104 can be used as part of a modern personalized reminder system that uses quick text/ink/voice entry along with structured and unstructured note application features to provide a free form note taking capability. In an embodiment, the note component 104 can be configured with a free form note taking surface proximally located near or adjacent to an email inbox, message interface, calendar surface, etc. to facilitate free form note taking that enables quick capture of ephemeral information that arises in the course of information work. The note component 104 is configured to present ambient reminders as memory triggers to note users to perform or review previously noted tasks or other information, including using blank note triggers as focus placeholders.

The note component 104 provides note input methods and applications that correspond with extremely low effort actions for reminder entry. The note component 104 of an embodiment is configured to use note-taking features, including blank note application features to, but is not so limited: associate notes spatially next to email items (e.g., inbox, sent, etc.); associate notes with various contact items (e.g., each person vcard); associate notes with various calendar items; and/or place and subsequently resurface reminders using various resurfacing controls to remind the user of a note (e.g., over areas that require attention regularly). For example, the note component 104 can be used to resurface notes placed next to the inbox, calendar, or other high frequency "revisit" areas.

The note component 104 can be configured to use particular UI locations where free form notes are visible to the user and can be applied on Inbox Items, Contacts, a Calendar surface, Calendar items, a scratch pad disassociated from items. Variations in the font, size, and/or color of each note can be used to generate additional informational note dimensions for the user. The note component 104 is also configured to specify and/or use fuzzy-time parameters such that reminders are not required to fire at a specific granular time. Fuzzy-time based reminders can be configured to surface in a gentle manner during a broad period simply as an ambient artifact (e.g., set something for Saturday morning, the item slowly starts to surface from Friday night into the morning gathering more attention gradually.) Electronic notes are useful in setting reminders, placement on a calendar grid, direct text entry for a time (e.g., 9 am tomorrow), direct text entry for a fuzzy time (e.g., tomorrow morning), etc. Blank notes can be used as a simple visual reminder and/or to surface prior work and/or application states.

Modern electronic reminders, including blank electronic notes, are useful for both personal and business uses. Surfacing of reminders can be maintained using two reminder classes, but is not so limited: pull reminders and push reminders. Pull reminders can be configured to create a low level of interruption and simply provide ambient awareness. In contrast, push reminders can be configured to facilitate contextually appropriate interruptive calls for attention. Push reminders can be configured to include an added level of awareness for what the user is doing and whether it is ok to interrupt their stream of thought. Pull reminders, on the other hand, are a different class of memory aid designed to attract minimal attention during regular use, but strategically placed to give summaries of important action items and access to useful reference information near a revisit center (e.g., inbox, calendar, contacts, etc.). In an embodiment, pull reminders include a scratch pad, WINDOWS MOBILE "on the go" area, calendar, and/or lists, but is not so limited.

An electronic scratch pad can be used for locating pull reminders due in part to a large/conducive free form entry surface. The electronic scratch pad can be included as part of a larger UI (e.g., OUTLOOK UI) and graphically advertise its affordance as a place for random work/personal/email related notes, links to soon to be needed documents, or pictures/video. The electronic scratch pad can be used as an entry point for physical writing/texting/orating as part of an electronic reminder ecosystem (e.g., distributed among OFFICE, OUTLOOK, EXCHANGE, other systems, etc.).

A synchronization model for replicating items/information between user devices (e.g., smartphone and laptop) of an electronic reminder ecosystem gives the user a predictable understanding of how and when to leverage an electronic scratch pad. Example uses for the electronic scratch pad include quick entry items like addresses, temporary phone numbers and contact information (e.g., restaurant info, event info, etc.). Dropping items or entering information using the electronic scratch pad gives the user confidence that it will replicate to each synchronizing device and be available while on the go.

As described above, the electronic calendar surface also represents a surfacing location for ambient reminders. The calendar component 102 is also configured to accept free form placement of notes on the electronic calendar surface. In one embodiment, three classes of items can be used to populate the electronic calendar surface including date free text. The first class, and least complex class, includes free form notes placed directly onto a date grid. Short date free strings can be pinned to a location where they were jotted down to serve their purpose as a record.

The second class includes start time date text where the calendar component 102 or other component automatically detects time related strings in entries on the calendar surface. These will be mapped directly into reminders at the stated times, with a possible roll up to an all up day preview reminder during the first session of the day. In addition, entries with start time data can be configured to automatically reorder themselves within the associated date range from earliest to latest. The third class includes personal notes that generally comprise free form inputs with start and end times that do not require any particular treatment. In one embodiment, the start time of a personal note can be considered and used to control behavior as with other calendar items having only a start time.

A key property of natural reminder mechanisms employed in everyday life is quick capture and proximity to the originating triggers. An electronic note provides an immediately usable, physically close, electronic note representation to remember a fragment of information. In addition there are specific locations where people will revisit regularly during the day such as the inbox and the calendar tracking surface to present personal note taking capabilities. Electronic note representations can be used to maintain flow and focus since jotting down quick notes is typically paired with a desire to remain focused on a more pressing primary task. Users should be able to leave their reminder and return to the original task with minimal interruption and effort.

Relevant electronic note representations and reminders can be efficiently brought to the user's attention to keep issues fresh throughout the entire day or some time period.

The system 100 of an embodiment can operate to resurface reminders in a number of useful ways. One feature involves subtly jogging a user's memory by providing UI conventions and cues to help people remember to use their own memories for executing a task, recognizing that the user's mind is frequently the most efficient information store of all requiring a trigger to remember. Another feature presents reminders as passive ambient fixtures in the periphery unless active interruption has been requested.

The system 100 can strike a balance between not noisy enough and not surprising the user too close to a deadline while bombarding the user with an undesired stream of notifications. The system 100 can use spatial artifacts to allow placement of "marks" or markup on items to provide a self-sufficient way of reminding. The system 100 can account for grouping of objects in space to be respected as a supported method of reminding and organization. Ambient reminders can be used in conjunction with active reminder functionality to reduce chaos and ambiguity of user schedules. The reminder features are built to respect a user's attention and trying to grab as little attention as possible to provide an effective reminder.

The system 100 makes it easy to target a reminder or relocate an artifact to a rough point in time and space, and to not treat the need to update the reminder as a sign of failure. Instead incorporate the ability to change and retarget reminders as a central expected mode of use as it reflects reality. The system 100 also makes it easy to create and destroy reminders accounting for quickly changing user focus and fluid working environments. While a number of embodiments are described, it will be appreciated that other embodiments are not so limited.

Figure 2:
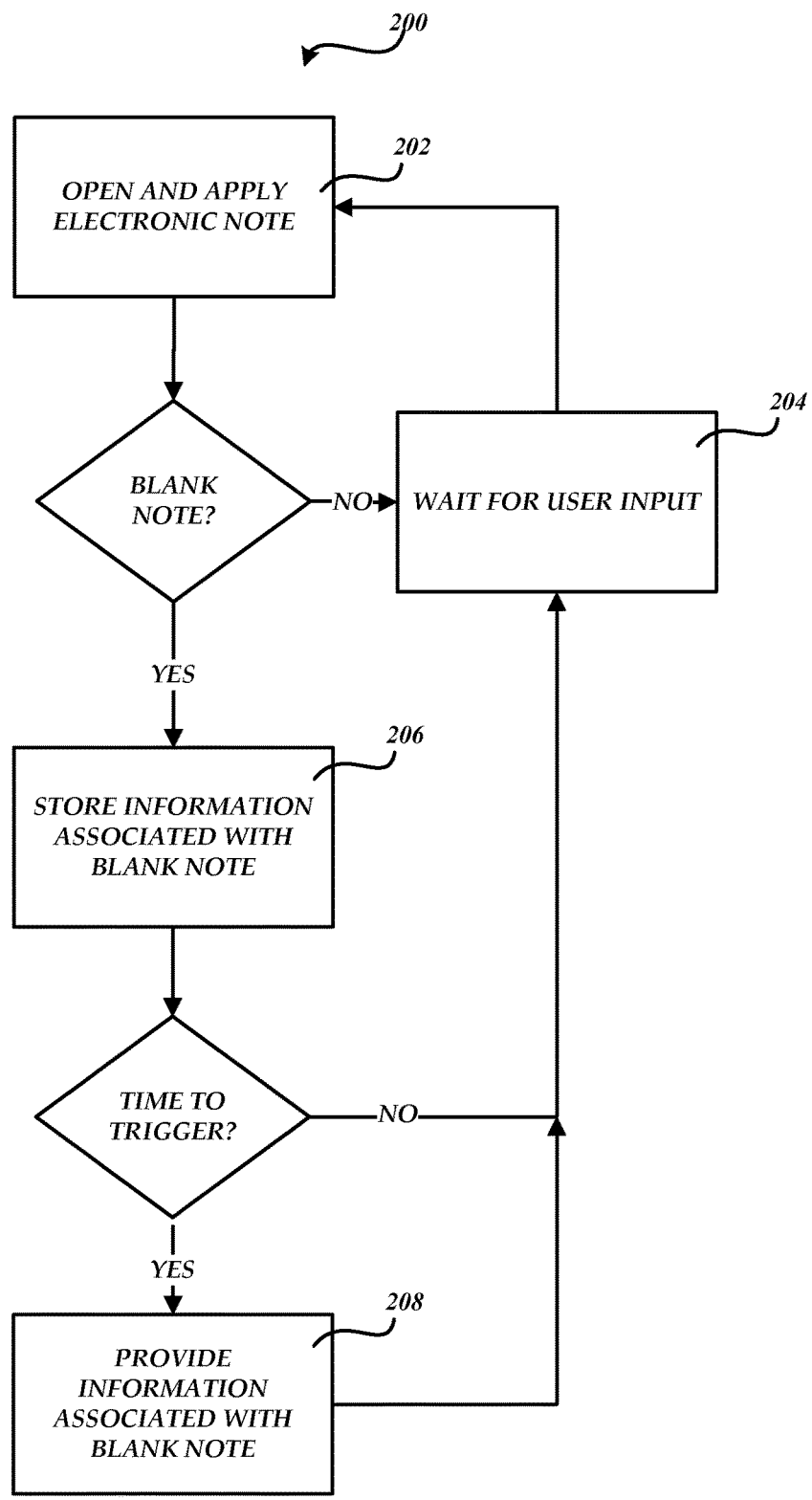
FIG. 2 is a flow diagram depicting an exemplary process of using a note-taking application.

FIG. 2 is a flow diagram depicting an exemplary process 200 of using a note-taking application to use electronic notes, including using blank notes as part of storing and/or restoring an application or UI context, but is not so limited. For example, the exemplary process 200 can use a blank note trigger to resurface previously stored application information associated with a prior user focus when applying a blank note. In one embodiment, the process 200 can be encoded using complex programming as part of providing note-taking and application features. The process 200 of an embodiment begins at 202 when a user opens and applies an electronic note. For example, a user can use an input mechanism to open a note and/or use free form input to enter information as an electronic note before applying the note to a particular location. As described above, the process 200 can also be used to open and apply blank notes according to a user preference.

At 204, if the process 200 determines that a user is not applying a blank note, the process 200 tracks the populated note and can resurface the note according to a reminder protocol, and proceeds to 204 waiting for user input. However, if the process 200 determines that the user has applied a blank note (e.g., nothing entered into the body of the note), the process 200 proceeds to 206 and stores information associated with the blank note. For example, the process 200 of an embodiment at 206 can operate to store an application context and/or screen state upon applying a blank note, including any information associated with any open windows, and tie or associate a blank note trigger with the blank note for use in resurfacing operations. In an embodiment, the process 200 operates to determine and/or store triggering parameters for each blank note used in determining trigger times and/or resurfacing priorities. For example, one type of application may have a higher resurfacing priority than another application associated with a blank note or blank note application times can be used for resurfacing determinations (e.g., resurface windows/applications for a most recent note).

If time or criteria to trigger a blank note is true or the like, at 208, the process 200 of an embodiment operates to resurface the information associated with the blank note trigger for the particular blank note. Otherwise, the process 200 proceeds to 204 and waits for user input. In one embodiment, the process 200 can provide a list of blank notes for review including providing a preview of the screen state associated with a selected blank note. As described above, pull and push reminder protocols can be used as part of a blank note triggering and resurfacing operations. While a certain number and order of operations is described for the exemplary flow of FIG. 2, it will be appreciated that other numbers and/or orders can be used according to desired implementations.

Figure 3A:
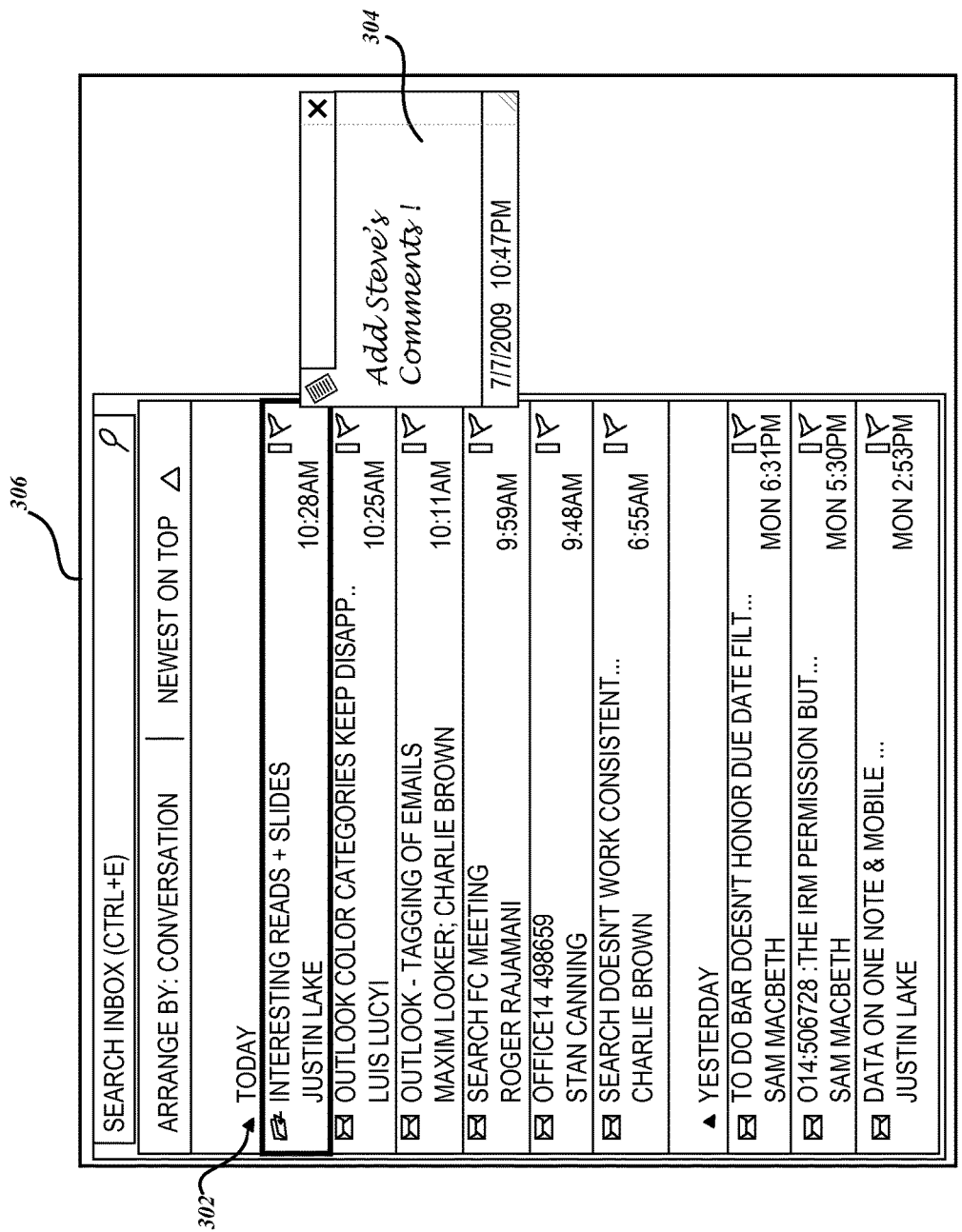
FIGS. 3A-3I depict examples of electronic note applications, including blank note applications.

FIGS. 3A-3I depict examples of electronic note applications, including blank note applications. As shown in FIG. 3A, a user has applied an electronic note 304 adjacent to an email inbox list 302 of an application window 306. Note information, including blank note information, can be stored when a user closes an associated application or item. Note-taking features can be brought into focus upon a right-click action or the like, or a dedicated note interface can be added to an application ribbon as just a few examples.

Figure 3B:
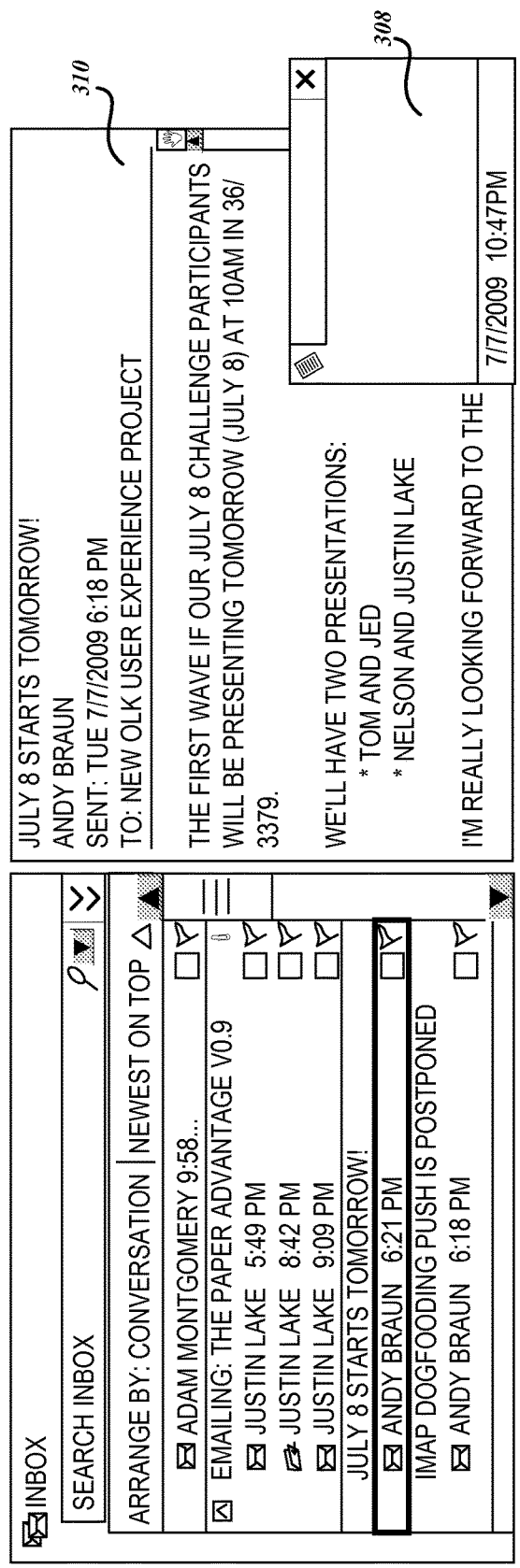

FIG. 3B depicts a blank note 308 as applied by a user to an email item 310. As described above, a blank note trigger can be associated with the blank note 308 as part of providing a blank note restoration and reminder process.

Figure 3C:
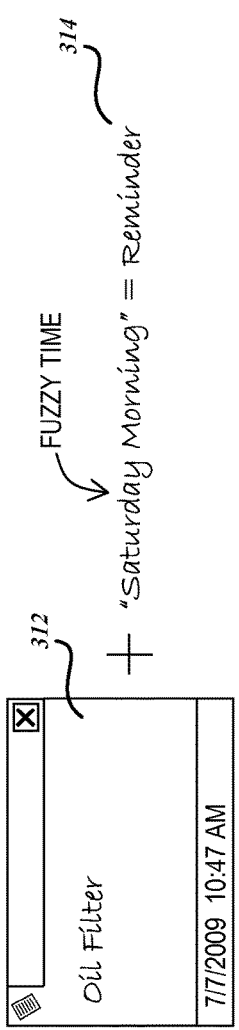

FIG. 3C illustrates use of a note 312 and a fuzzy time (e.g., "Saturday Morning") as part of providing and/or triggering a reminder 314.

Figure 3D:
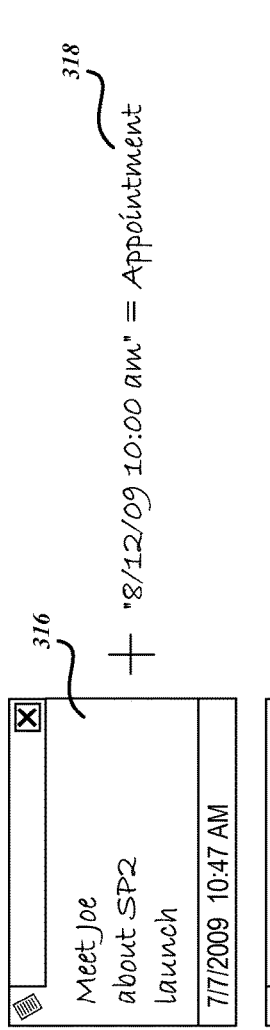

FIG. 3D illustrates use of a note 316 and a particular day and time as part of providing and/or triggering an appointment 318.

Figure 3E:
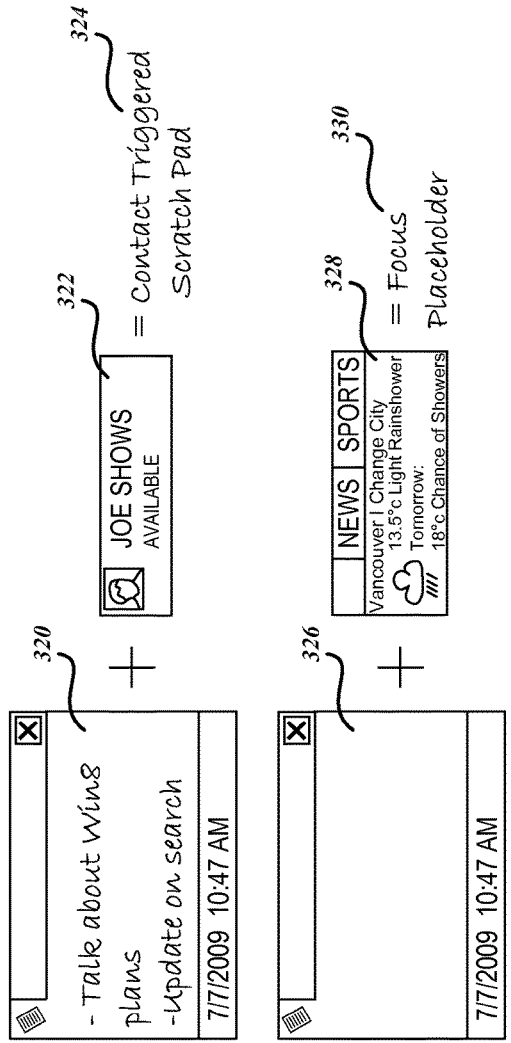

FIG. 3E illustrates use of a note 320 and a particular contact 322 as part of providing a contact triggered scratch pad 324.

Figure 3F:
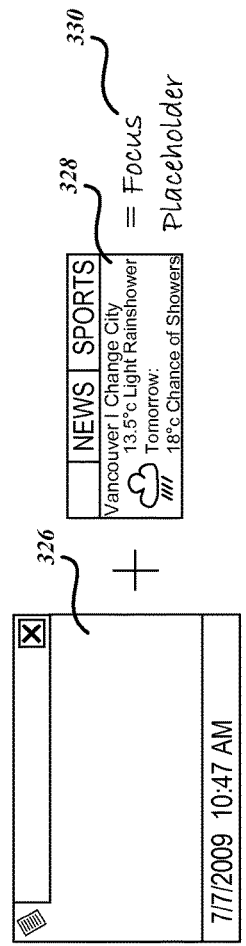

FIG. 3F illustrates use of a blank note 326 and an application context 328 (e.g., open browser page, open document, open spreadsheet, etc.) as part of providing and/or triggering a focus placeholder 330.

As described above, blank notes can be used as part of providing a reminder mechanism that includes a minimalized gesture mechanism for specifying an action that is personally meaningful to the blank note user. A blank note can be correlated to the action of physically leaving a reminder (e.g., leaving something important near the car keys). Electronic blank note features serve a number of useful functions for information workers that depend on PIM systems (e.g., calendars, contacts, email, messaging, etc.). Electronic blank notes can be used to store and/or restore device, system, application, and/or other states and/or: serve as an anchor for a last location of focus in between interruptions; serve as a shortcut for quickly rehydrating a work context including open items and/or applications at the time of a blank note application; and/or be spatially co-located to something graphical or textual on the screen which triggers the user's memory to perform a task (e.g., web-based and local contexts).

In an embodiment, a blank note trigger can be configured to restore a working state based in part on user interactions leading up to application of an associated blank note. In one embodiment, a note-taking application or component can operate in conjunction with an O/S component to track applications/items to be restored using a blank note trigger.

In one embodiment, the path traversed by a blank note before applying/locating can be taken into account when determining windows/applications to be restored using a blank note trigger associated with the blank note application.

As an example, a user can click on a create note icon to display a blank note, and tracking relevant windows or applications while the user holds down the mouse or the like (e.g., holds CTRL, uses a touchscreen input) and swipes over the various items displayed on a display screen. In one embodiment, the note component 104 or some other component can query the O/S regarding applications the blank note has traversed over or moved within some proximity (e.g., based on a proximity measure of distance between a blank note and an application item). When over applications that provide additional information (e.g., browser), it will be noted what data is being displayed and the state stored. (e.g., URL shown). When the user releases a blank note (e.g., mouse click release, lift finger off touch screen, etc.), the note component 104 displays the blank note shown with a context recovery or restore icon shown denoting a state has been saved and can be recovered.

The note component 104 stores data associated with the blank note which can be recovered. For example, the user can mouse click and hold on the restore icon on a blank note and the note component 104 can retrieve data on all windows that were considered part of the stored context using the blank note (e.g., documents opened, emails opened as reference for a reply, URLs in the browser, etc.). In one embodiment, the note component 104 can render a preview of the context as a replacement of the existing windows opened or workspace, wherein all existing windows not part of the stored context are minimized and/or hidden in a non-destructive manner. If the user does not release the mouse click over the restore icon, the preview fades away and the stored context is not yet restored. If the user does release the mouse click over the restore icon, the stored context is restored and existing windows are minimized and/or hidden.

Figure 3G:
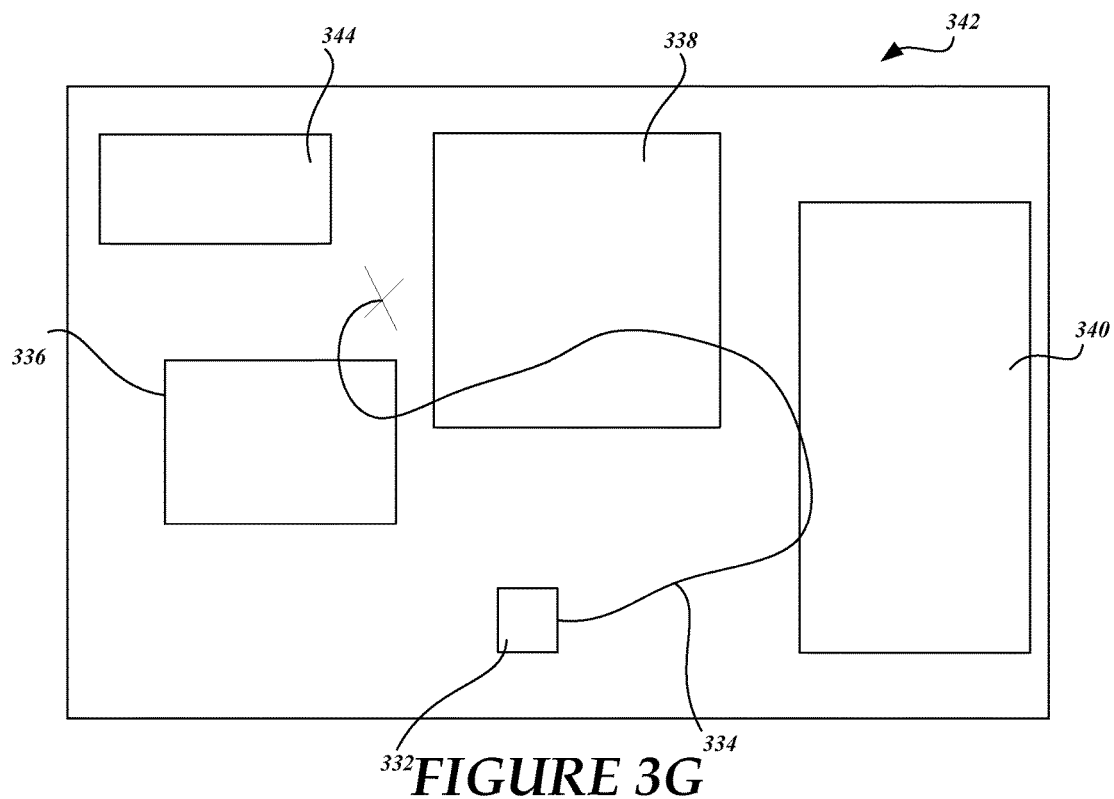

FIG. 3G illustrates application of a blank note 332 and the path of application 334. As described above, the note component 104 can use the path of application 334 to determine items (e.g., items 336, 338, 340, 344) to restore using an associated blank note application trigger. As shown in FIG. 3G, the path of application 334 has traversed a number of opened windows 336-340 on the user desktop area or workspace 342. In one embodiment, as part of remembering and resurrecting a workspace, any intersected open items (e.g., windows, applications, documents, photos, calendar view, etc.) swiped over with a blank note are tagged as a relevant grouping for restoring at some subsequent time. In another embodiment, as part of remembering and resurrecting a workspace, a blank note can be simply applied to the user workspace, and the note component 104 can tag any open items (e.g., emails, documents, web pages, calendar items, etc.) and the spatial arrangement of the collection as a relevant grouping for restoring at some subsequent time.

Figure 3H:
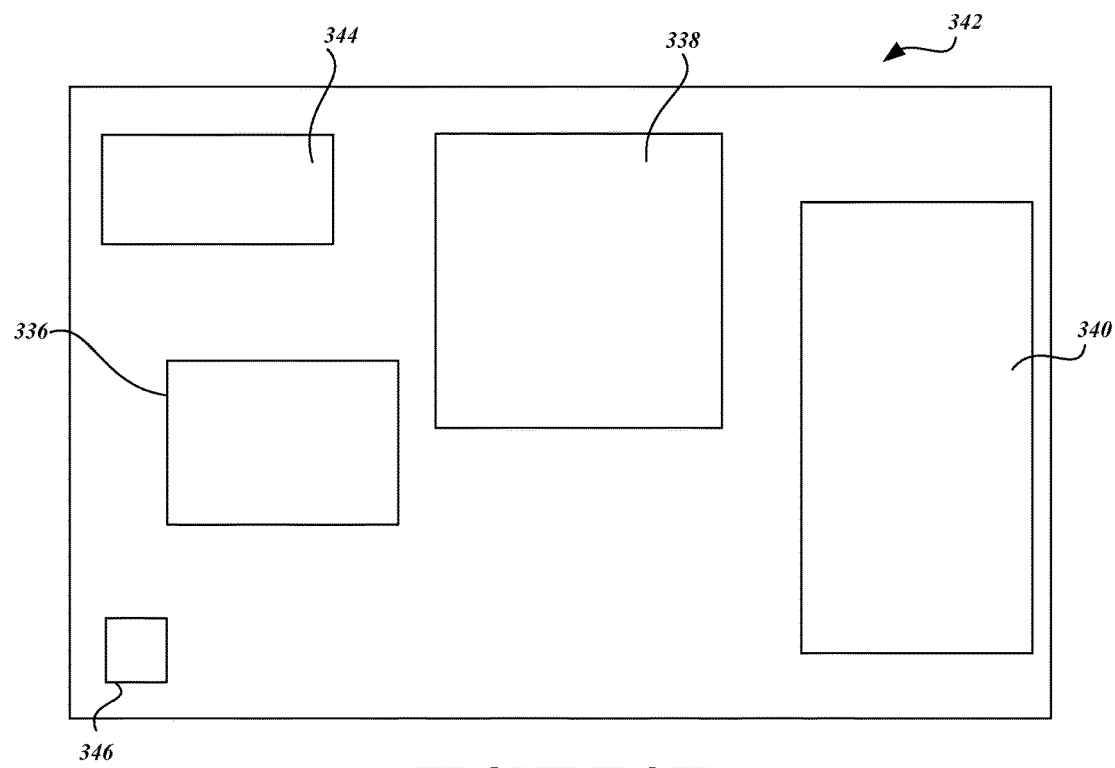

FIG. 3H illustrates application of a blank note 346 to remember all open items on the user workspace 342 and the spatial arrangement of the items as a relevant grouping for restoring at some subsequent time.

Figure 3I:
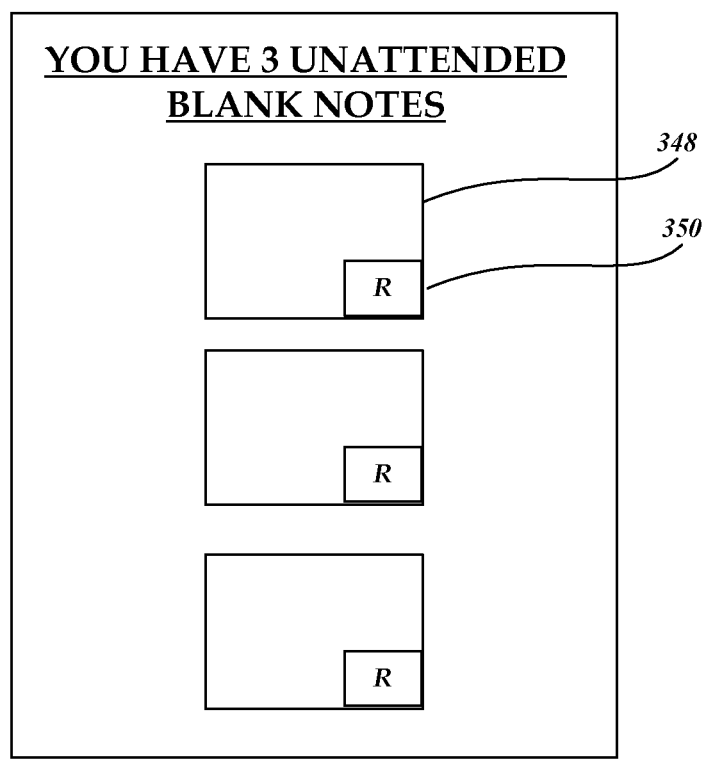

FIG. 3I depicts a blank note UI 348 configured with a restore activation portion 350 that can be clicked/tapped to restore a prior configuration associated with a blank note trigger and application. As part of restoring a working state associated with a blank note, once a user is ready to retrieve a reminder after an interruption for example, one could simply click on the restore activation portion 350. To avoid confusing intent to enter text on the blank note from desire to restore, the restore activation portion 350 is used as a click target for a restore action. Blank notes indicators can be stored on the workspace or along with an associated application/item. As described above, a pop-up interface can also be used to display blank notes yet to be revisited.

Figure 4:
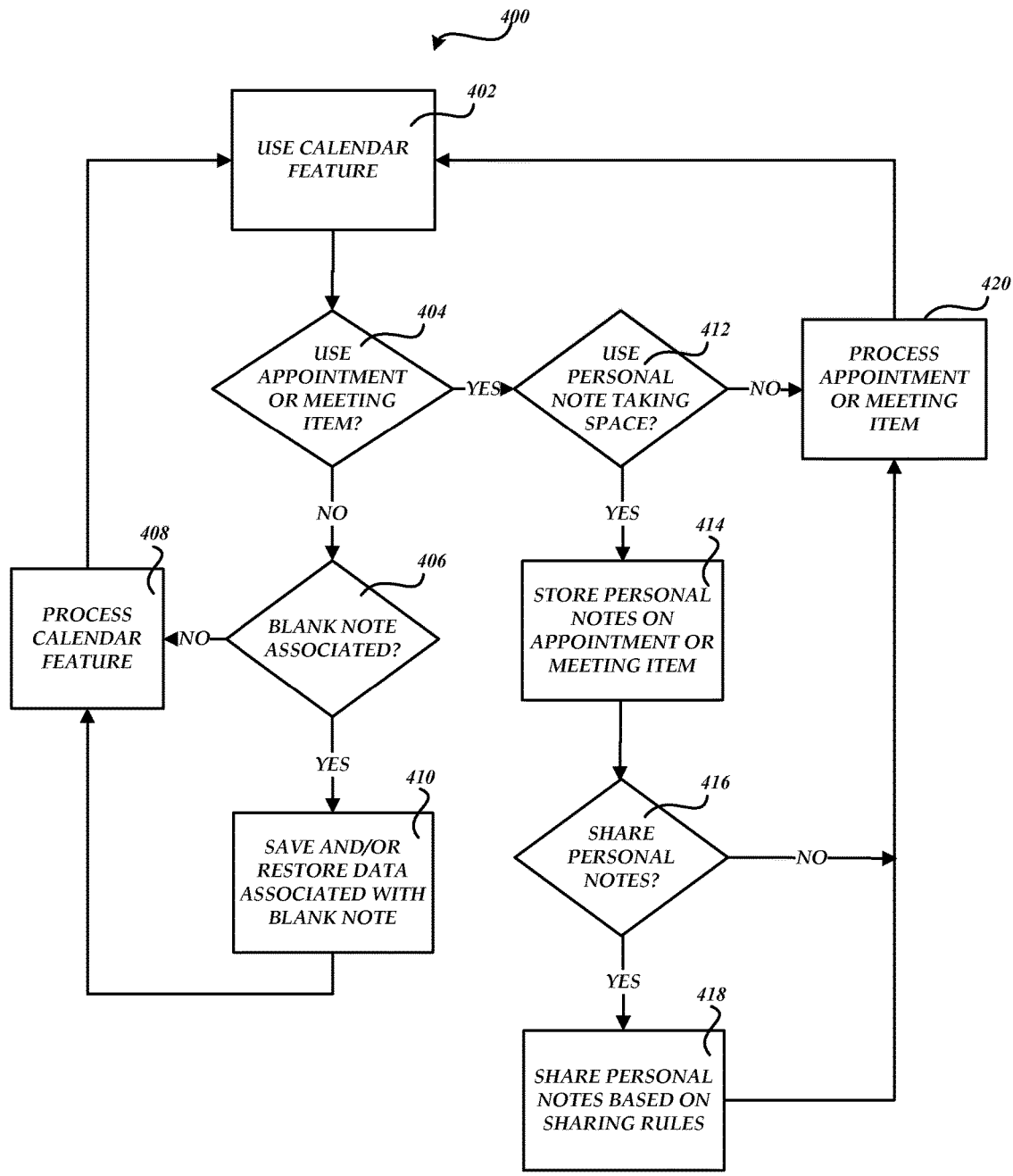
FIG. 4 is a flow diagram depicting an exemplary process associated with modern electronic calendar features.

FIG. 4 is a flow diagram depicting an exemplary process 400 associated with modern electronic calendar features, but is not so limited. For example, a user can use a smartphone to open a personal calendar after synching with any other relevant devices/system. The process 400 can be implemented as part of using different end-user devices (e.g., a desktop, laptop, smartphone, tablet, etc.). The process 400 of an embodiment begins at 402 when a user selects, uses, accesses, or otherwise interacts with a calendar item or view. For example, a user can use a web-based or locally installed calendar application to open and review upcoming appointments and meetings.

The process 400 at 404 determines if a meeting or an appointment is being used. If a meeting or an appointment is not being used at 404, the process 400 at 406 determines if a blank note has been associated with the calendar feature, such as a blank note applied to a calendar day view pertaining to an upcoming project for example. If a blank note has not been associated with the calendar feature, at 408 the process 400 processes the calendar feature and returns to 402. If a blank note has been associated with the calendar feature at 406, at 410 the process 400 saves data associated with the blank note, such as configurations of screen/application(s)/item(s) for example, and proceeds to 408.

If a meeting or an appointment is being used at 404, the process 400 at 412 determines if a personal note-taking space associated with the meeting or an appointment is being used. If a personal note-taking space associated with the meeting or an appointment is being used, the process 400 stores the personal notes on the meeting or the appointment at 414. The process 400 returns to 406 and determines if a blank note has been associated with the calendar feature, such as a blank note applied to the meeting or appointment or personal note-taking space as examples.

If a blank note has been associated with the calendar feature, at 410 the process 400 saves data associated with the blank note, such as configurations of the calendar view, appointment, and/or meeting items for example, and proceeds to 416 where the process 400 determines if personal notes are to be shared. For example, sharing rules can be configured for an enterprise to enable personal note sharing according to defined working relationships and associated meeting or appointment items. If the personal notes are to be shared, the process 400 at 418 shares the personal notes based on sharing rules or some other determination. The process 400 proceeds to 420 and processes the meeting or appointment item.

The exemplary process 400 can provide calendar and other features as part of encoded computer software, including functionality to process information using a distributed computer network and computer input/output components including touch-based, voice-activated, pen-based, etc. While a certain number and order of operations is described for the exemplary flow of FIG. 4, it will be appreciated that other numbers and/or orders can be used according to desired implementations.

FIGS. 5A-5H depict examples of a number of electronic calendar application features.

Figure 5A:
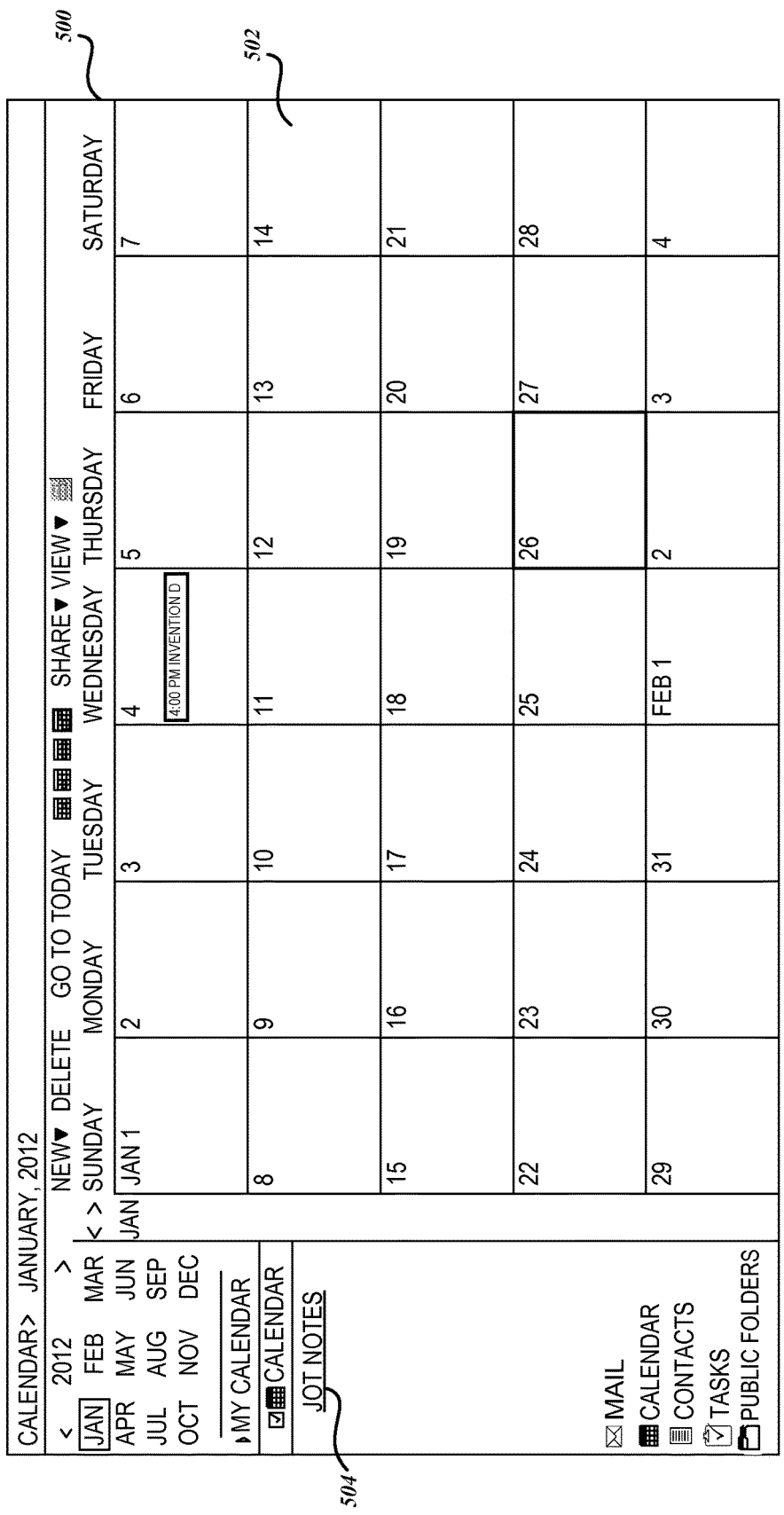

FIG. 5A depicts an exemplary electronic calendar application 500 that includes a free-form input electronic calendar surface 502 that having a note-taking space 504.

Figure 5B:
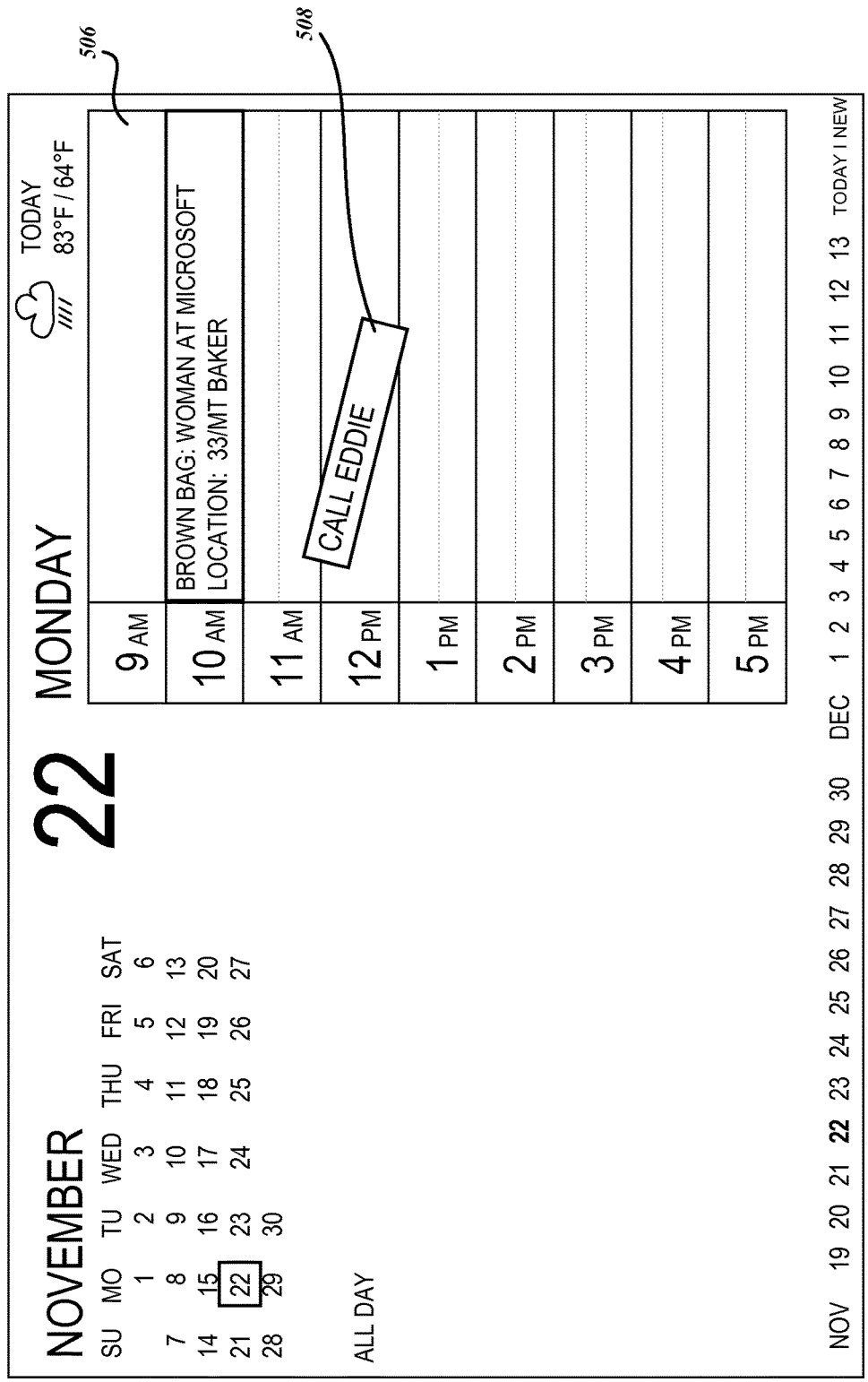

FIG. 5B depicts a calendar view 506 that includes a free-form input electronic calendar surface where a user has provided free-form input to a time slot of the calendar view 506. The user has used distinguishing features, such as color, font size, and orientation to bring attention to the note 508.

Figure 5C:
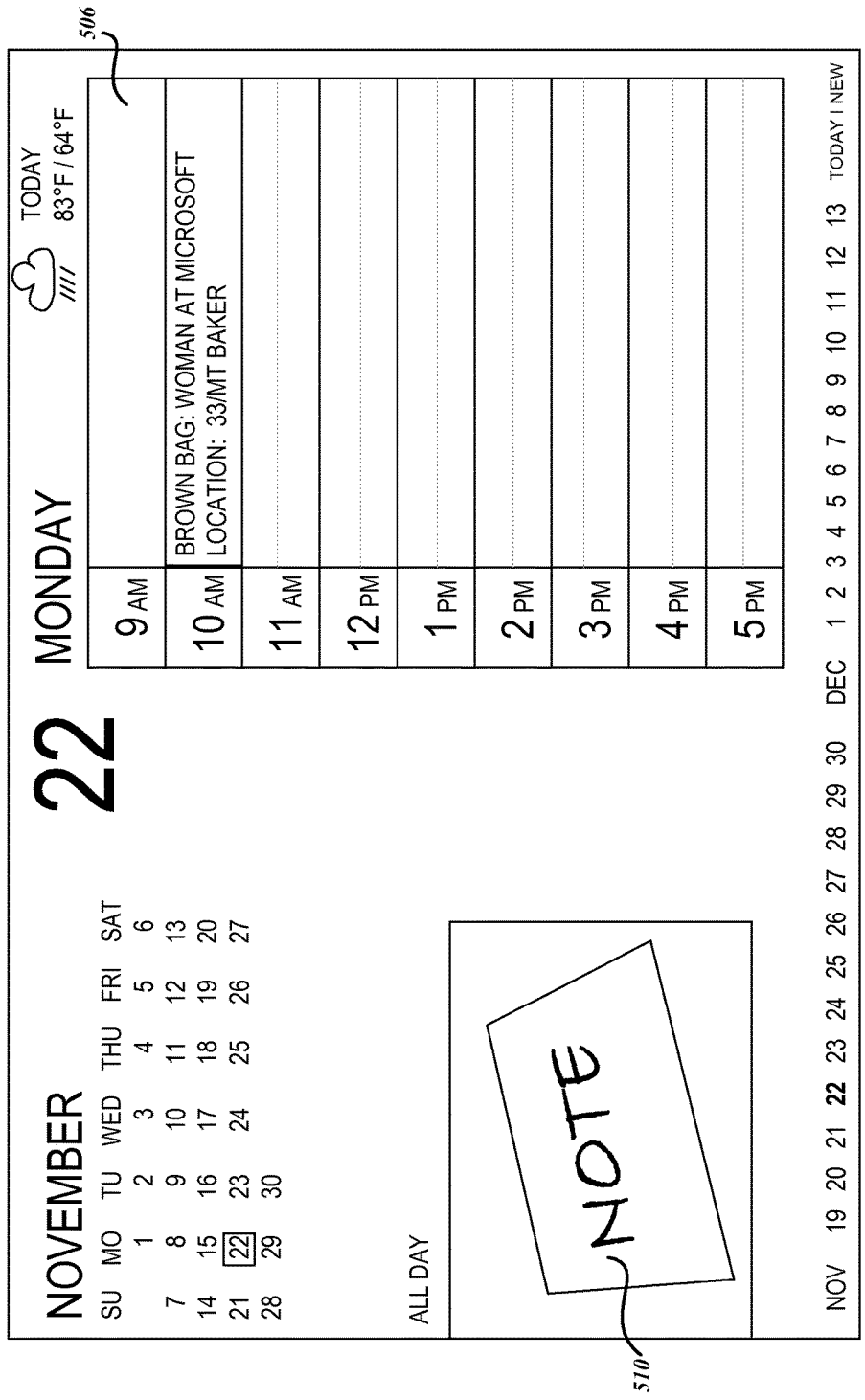

FIG. 5C depicts the calendar view 506 where a user has applied an electronic note 510 to the view 506, which is displayed as an all day appointment.

FIG. 5D depicts a calendar view 512 that includes a free-form input electronic calendar surface 514 displaying a number of free form user entries differentiated from one another using color, font size, anchoring, and/or boundary differentiators.

FIG. 5E depicts the calendar view 506 displaying a number of free form user entries differentiated from one another using color, font size, anchoring, and/or boundary differentiators.

Figure 5F:
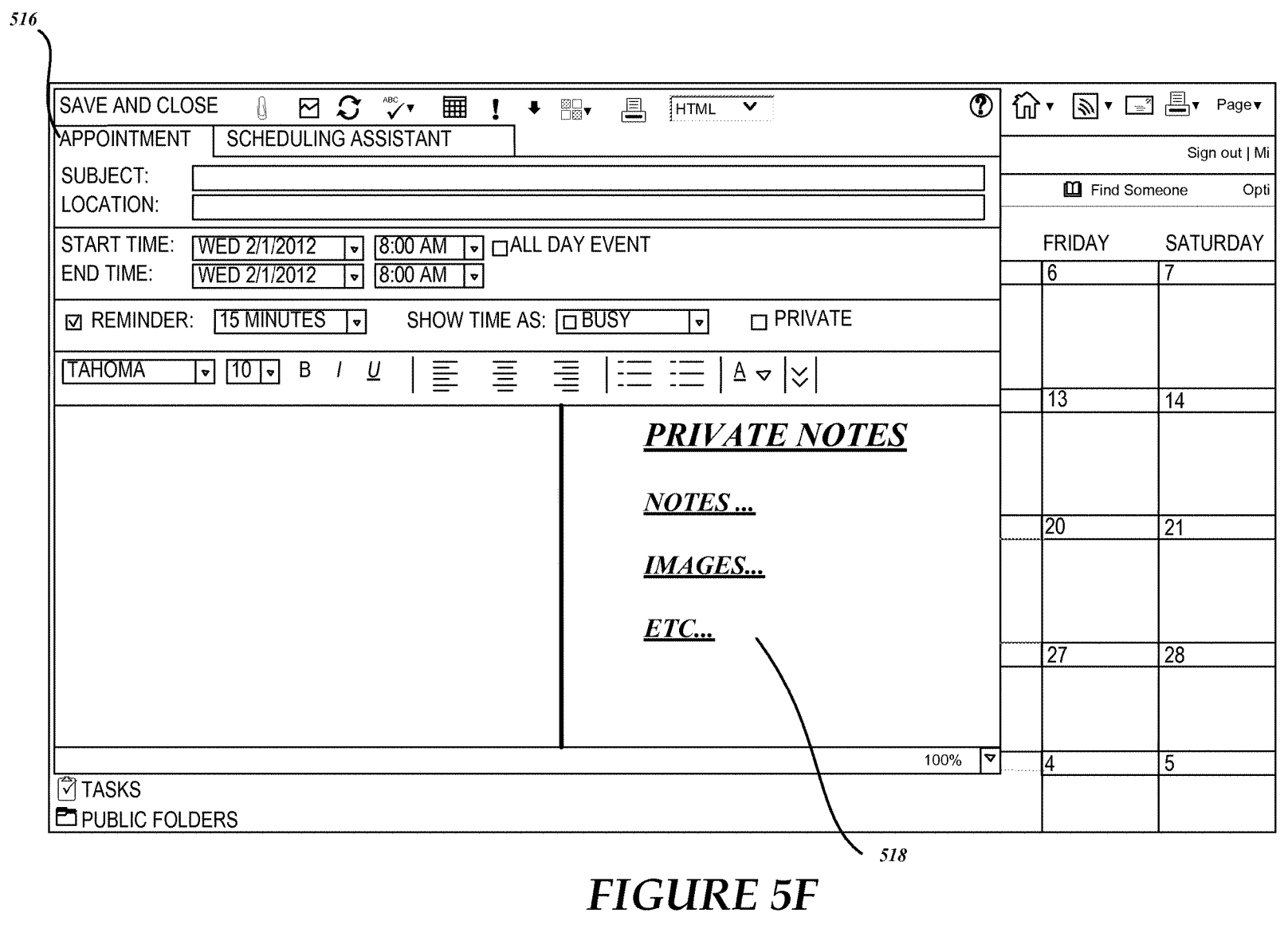

FIG. 5F depicts an appointment item 516 that includes a note-taking space 518 for taking personal notes for instantiation upon an appointment occurrence.

Figure 5G:
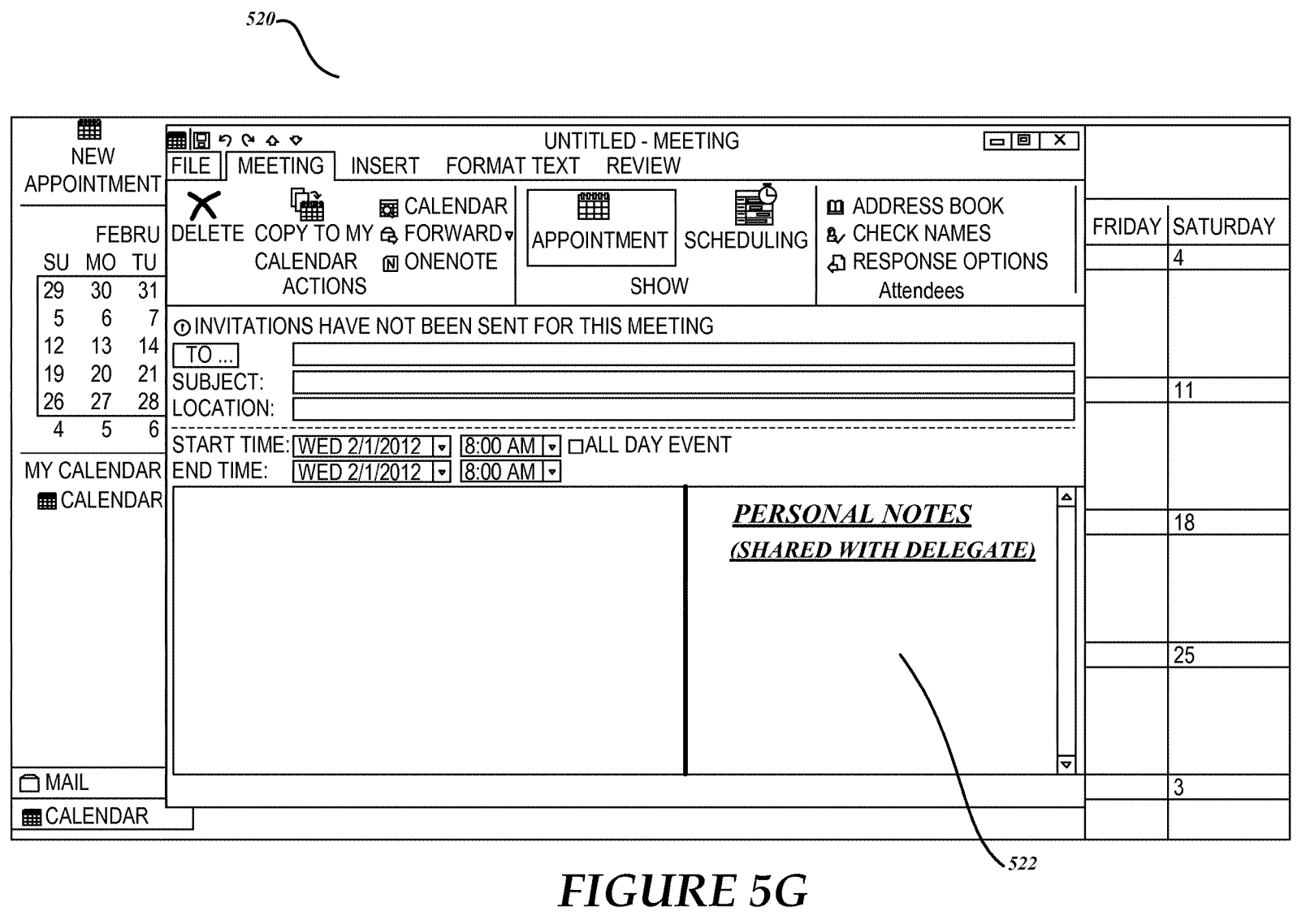

FIG. 5G depicts a meeting item 520 that includes a note-taking space 522 for taking personal notes that includes notation identifying the private or personal space.

Figure 5H:
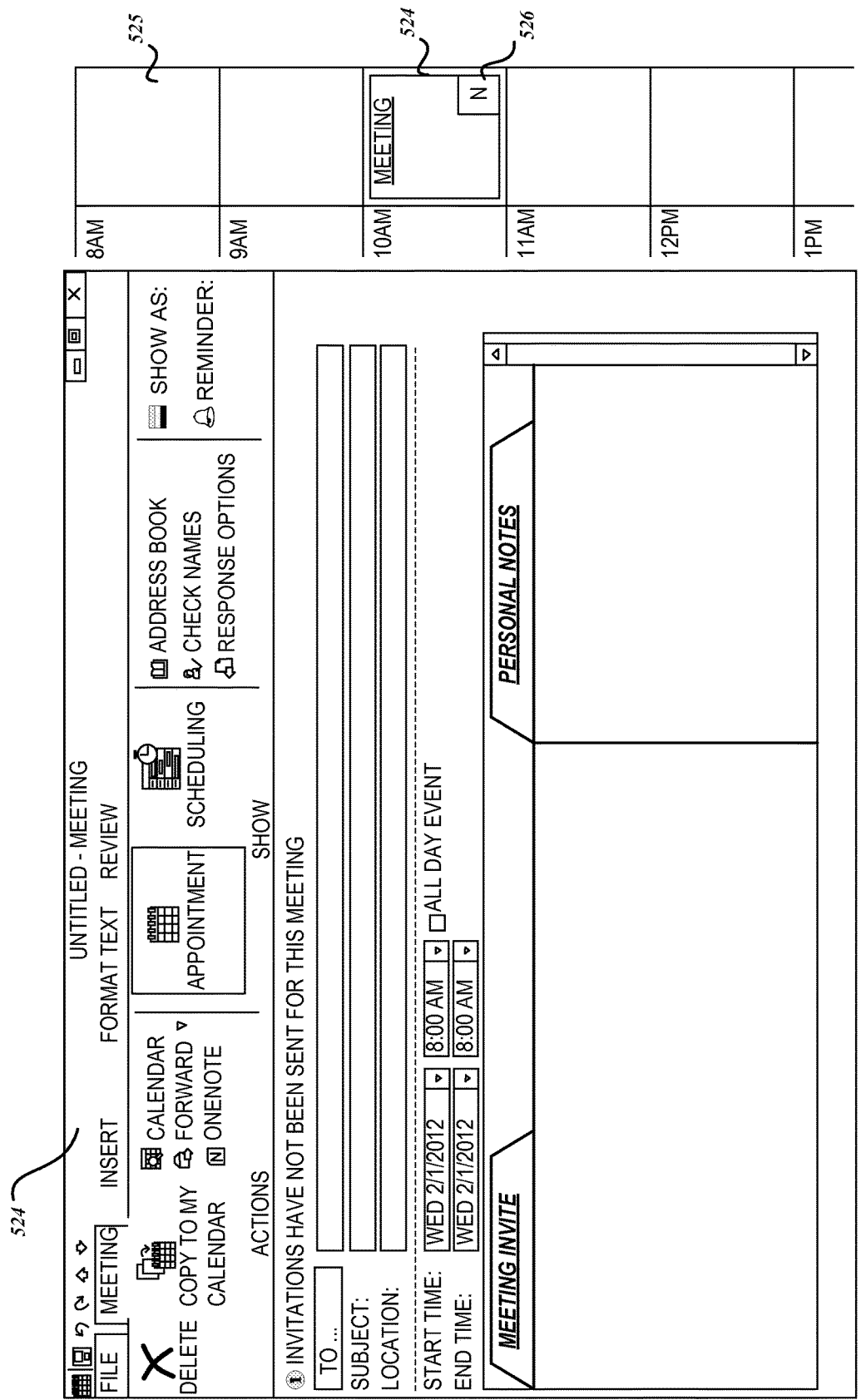

FIG. 5H depicts a meeting item 524 that includes a personal notes tab for selecting and entering personal or private notes along with a calendar view 525 reflecting the meeting item 524 along with a personal note icon 526 that indicates personal note data associated with the meeting item 524.

It will be appreciated that various features can be implemented as part of a processor-driven computer environment including hardware and software components. Also, while certain embodiments and examples are described above for illustrative purposes, other embodiments are included and available, and the described embodiments should not be used to limit the claims. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

The term computer readable media as used herein can include computer storage media. Computer storage media can include volatile and nonvolatile, removable and non-removable media implemented in any method or technology for storage of information, such as computer readable instructions, data structures, program modules, etc. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or other code. Exemplary components include an application, a server running on the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Exemplary Operating Environment

Figure 6:
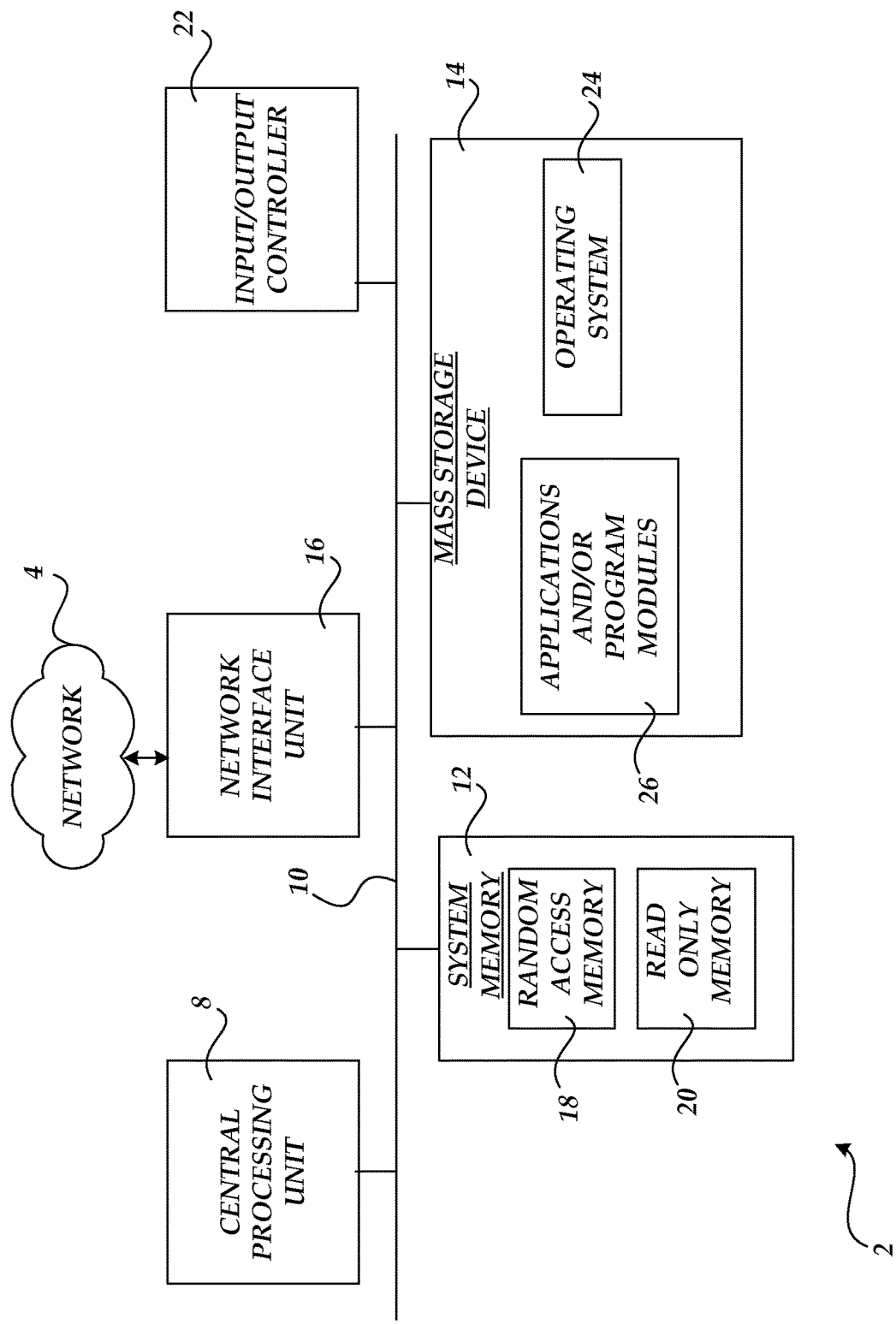
FIG. 6 is a block diagram illustrating an exemplary computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative operating environment for embodiments of the invention will be described. As shown in FIG. 6, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer device comprising:
   a processor; and
   a memory storing computer-executable instructions that when executed by the processor cause the computer device to provide an electronic calendar comprising:
      providing a calendar input surface on a display screen of the computer device, wherein the calendar input surface includes a number of freeform input types configured to receive freeform inputs directly on the calendar input surface;
      configuring a plurality of classes of items used to populate the calendar input surface that include:
         a first class that includes freeform notes, wherein a freeform note comprises a short date-free string pinned to an input location;
         a second class that includes text input having a start time, wherein upon detecting the start time, the text input is automatically mapped directly into a reminder dialog that surfaces at the start time, and wherein when the start time is a fuzzy time a notification of the reminder dialog is configured to surface slowly over a period of time as an ambient artifact;
         a third class that includes personal notes; and
         a fourth class that includes blank notes, wherein a blank note operates as a resurfacing trigger to automatically restore a user workspace, wherein swiping over one or more open items in the user workspace with the blank note tags and stores a state for each open item in a spatial arrangement with the blank note, and wherein restoring the user workspace includes restoring the one or more tagged open items in the stored state and in the spatial arrangement using the blank note resurfacing trigger; and
      providing a number of associated user interface (UI) elements including:
         a calendar grid element;
         a note element configured as an all day appointment; and
         an all day well element configured as a calendar section for receiving user input.

2. The computer device of claim 1, wherein the calendar input surface is configured to accept handwritten, keyboard, and touch screen input types.

3. The computer device of claim 1, wherein the calendar input surface is configured to receive freeform input using a variety of modalities including color markup, ink markup, non-orthogonal orientation of text, graphics, and video.

4. The computer device of claim 1, wherein the electronic calendar is configured to enable manipulations on the calendar input surface including resizing operations, relocation operations, and reorienting of text, ink or pictures.

5. The computer device of claim 1, wherein the electronic calendar is further configured to provide ad-hoc expressions of reminders and personalization on the calendar input surface.

6. The computer device of claim 1, further comprising an electronic slate calendar configured to support quick note taking on the calendar input surface using a range of expressive artifacts.

7. The computer device of claim 1, wherein the calendar input surface is further used to distinguish items using one or more of color parameters, item size parameters, and item anchor parameters.

8. The computer device of claim 1, wherein the electronic calendar configures the note element by repurposing parameters of an all day appointment element to enable quick note entry as ad-hoc text input to serve as user reminders.

9. The computer device of claim 1, wherein the electronic calendar is further configured to use the note element in conjunction with the all day well element to mark notes placed onto a time grid from the all day well as zero minute appointments.

10. The computer device of claim 9, wherein a start time or an end time is dictated by a freeform placement selection.

11. The computer device of claim 1, wherein the number of associated UI elements further includes one or more of: a time grid element, an agenda view element, an appointment element, a meeting element, an edit box element, and a reminder element, and wherein the calendar section associated with the all day well element is displayed as part of a week/day view for displaying items without a specific start time.

12. The computer device of claim 1, further configured to launch aspects of the electronic calendar based on use of the blank note resurfacing trigger.

13. The computer device of claim 1, further comprising one of a tablet computer, a desktop computer, a laptop computer, and a smartphone.

14. A method executed on a computing device, the computing device comprising a processing unit, a system memory storing computer-readable instructions that when executed by the processing unit cause the computing device to perform the method, the method comprising:
   receiving one or more freeform inputs directly on an electronic calendar surface of an electronic calendar, the one or more freeform inputs comprising a plurality of classes of input comprising:
      a first class that includes freeform notes, wherein a freeform note comprises a short date-free string pinned to an input location;
      a second class that includes text input having a start time, wherein upon detecting the start time, the text input is automatically mapped directly into a reminder dialog that surfaces at the start time, and wherein when the start time is a fuzzy time a notification of the reminder dialog is configured to surface slowly over a period of time as an ambient artifact;

a third class that includes personal notes; and a fourth class that includes blank notes, wherein a blank note operates as a resurfacing trigger to automatically restore a user workspace, wherein swiping over one or more open items in the user workspace with the blank note tags and stores a state for each open item in a spatial arrangement with the blank note, and wherein restoring the user workspace includes restoring the one or more tagged open items in the stored state and in the spatial arrangement using the blank note resurfacing trigger;

displaying user entries including handwritten input entered directly on the electronic calendar surface including using color, font, and anchor parameters as distinguishing features; and marking time grid notes as zero minute appointments.

15. The method of claim 14, further comprising moving content associated with an all day well element to a different electronic calendar view and storing the content as a zero minute appointment.

16. The method of claim 14, further comprising using a number of associated UI elements that include one or more of a time grid element, an agenda view element, an appointment element, a meeting element, an edit box element, and a reminder element.

17. The method of claim 14, further comprising using animation operations to show existing notes animating out from a display area to temporarily provide an insertion point.

18. An apparatus, including a processing unit and a memory storing instructions which, when executed by the processing unit, cause the processing unit to perform operations comprising:

providing a calendar input surface on a display screen of the apparatus that receives freeform user inputs directly on the calendar input surface;

configuring a plurality of classes of items used to populate the calendar input surface that include:

a first class that includes freeform notes, wherein a freeform note comprises a short date-free string pinned to an input location;

a second class that includes text input having a start time, wherein upon detecting the start time, the text input is automatically mapped directly into a reminder dialog that surfaces at the start time, and wherein when the start time is a fuzzy time a notification of the reminder dialog is configured to surface slowly over a period of time as an ambient artifact;

a third class that includes personal notes; and a fourth class that includes blank notes, wherein a blank note operates as a resurfacing trigger to automatically restore a user workspace, wherein swiping over one or more open items in the user workspace with the blank note tags and stores a state for each open item in a spatial arrangement with the blank note, and wherein restoring the user workspace includes restoring the one or more tagged open items in the stored state and in the spatial arrangement using the blank note as the resurfacing trigger; and providing a number of UI elements including a calendar grid element, a note element, and an all day well element, wherein the instructions are further executed to mark time grid notes as zero minute appointments.

19. The apparatus of claim 18, including instructions which, when executed by the processing unit, use color, size, and input anchor parameters to control display of user input directly on the calendar input surface.

20. The apparatus of claim 18, including instructions which, when executed by the processing unit, repurpose an all day appointment for receiving user notes on an input section located adjacent to the calendar input surface.

* * * * *